（12） United States Patent
Matsumura et al.

(10) Patent No.: US 8,720,412 B2
(45) Date of Patent: May 13, 2014

(54) CONTROL APPARATUS FOR DIRECT INJECTION TYPE INTERNAL COMBUSTION ENGINE

(75) Inventors: Tetsuo Matsumura, Hitachinaka (JP);
Yoshinobu Arihara, Hitachinaka (JP);
Shinya Matohara, Hitachinaka (JP);
Motoyuki Abe, Hitachinaka (JP);
Takuya Mayuzumi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 697 days.

(21) Appl. No.: 12/974,591

(22) Filed: Dec. 21, 2010

(65) Prior Publication Data

US 2011/0155097 A1 Jun. 30, 2011

(30) Foreign Application Priority Data

Dec. 25, 2009 (JP) .................................. 2009-293704

(51) Int. Cl.
*F02B 3/00* (2006.01)

(52) U.S. Cl.
USPC ........................................... 123/299; 123/435

(58) Field of Classification Search
USPC ........................... 123/299, 304, 305, 434, 435
See application file for complete search history.

(56) References Cited

U.S. PATENT DOCUMENTS

| | | | | |
|---|---|---|---|---|
| 6,751,544 B2 * | 6/2004 | Hashimoto et al. | ........... | 701/107 |
| 6,845,746 B2 * | 1/2005 | Hilger et al. | .................. | 123/298 |
| 6,854,438 B2 * | 2/2005 | Hilger et al. | .................. | 123/260 |
| 7,054,734 B2 * | 5/2006 | Todoroki et al. | .............. | 701/105 |
| 7,100,365 B2 * | 9/2006 | Nishizawa et al. | .............. | 60/285 |
| 7,681,554 B2 * | 3/2010 | Stein et al. | ..................... | 123/478 |
| 2003/0217732 A1 | 11/2003 | Kataoka et al. | | |

FOREIGN PATENT DOCUMENTS

| | | |
|---|---|---|
| JP | 2001-12286 A | 1/2001 |
| JP | 2003-286879 A | 10/2003 |
| JP | 2006-316656 A | 11/2006 |
| JP | 2007-32326 A | 2/2007 |
| JP | 2009-185687 A | 8/2009 |
| JP | 2009-197635 A | 9/2009 |

OTHER PUBLICATIONS

Japanese-language Office Action dated Apr. 20, 2012 (Four (4) pages).
Japanese-language Office Action dated Sep. 4, 2012 (Four (4) pages).

* cited by examiner

*Primary Examiner* — John Kwon
(74) *Attorney, Agent, or Firm* — Crowell & Moring LLP

(57) ABSTRACT

A control apparatus for a direct injection type engine is provided for reducing an amount of fuel that adheres to and that remains on a crown surface of a piston so as to suppress the increase of Number of particles as well as advancing the first injection as much as possible when plural fuel injections are carried out in one cycle in the direct injection type engine. The first injection timing is set based on a pulse width of at least the first injection among each of injections split plural times, and when the pulse width of the split first injection is short, the injection timing of the first injection is more advanced as compared with a case of a longer pulse width of the split first injection.

14 Claims, 24 Drawing Sheets

FIG. 8
(A)
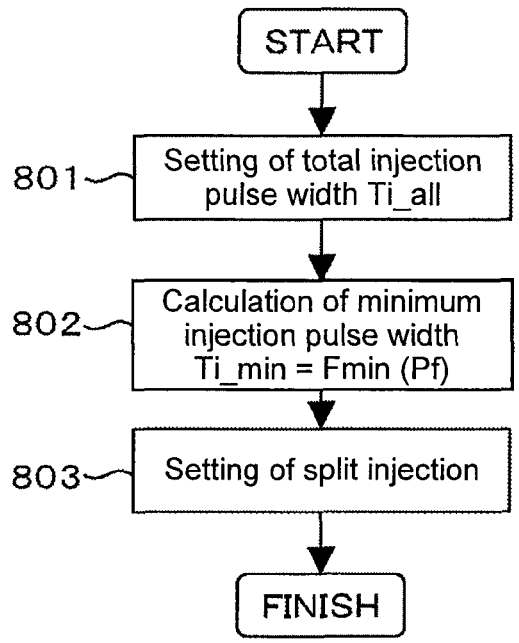
(B)
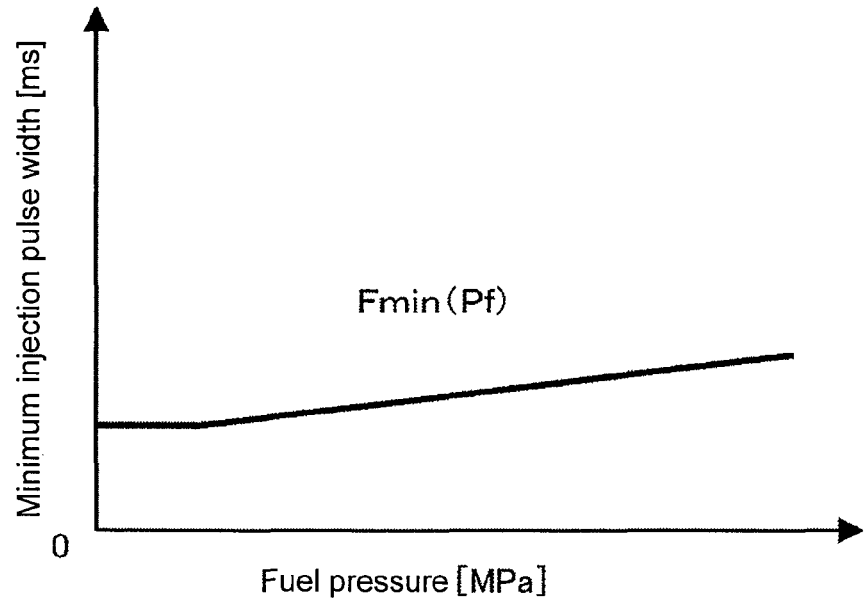

US 8,720,412 B2

CONTROL APPARATUS FOR DIRECT INJECTION TYPE INTERNAL COMBUSTION ENGINE

BACKGROUND OF THE INVENTION

1. Field of the Invention

The present invention relates to control apparatuses for internal combustion engines mounted on vehicles etc. and in particular, to a control apparatus for a direct injection type internal combustion engine.

2. Background Art

Current vehicles (automobiles) have been required to reduce exhaust gas substances contained in exhaust gas of the automobiles, such as carbon monoxide (CO), hydrocarbon (HC), and nitrogen oxide (NOx), and to reduce fuel consumption from the viewpoint of environmental protection. A direct injection type engine has being developed for the purpose of reducing the above.

The direct injection type engine reduces exhaust gas substances and fuel consumption, improves engine power, etc. by directly performing fuel injection with a fuel injection valve into a combustion chamber of a cylinder.

However, in the direct injection type engine, fuel spray that moves in the combustion chamber by injection tends to adhere to a crown surface of a piston and a wall surface of a cylinder bore. An adhesion amount of the fuel spray depends on a timing of fuel injection by the fuel injection valve.

If assuming the timing of fuel injection by the fuel injection valve as an intake stroke, when the timing of fuel injection is relatively advanced, while a time period for fuel vaporization between fuel injection and ignition is ensured to be able to improve combustibility, fuel adhesion to the crown surface of the piston increases since the fuel injection is performed at the time of the crown surface of the piston being closer to an injector. Particularly, the fuel having adhered to the crown surface of the piston is gradually atomized at the time of subsequent engine combustion, and then discharged out of the cylinder in a state of incomplete combustion (JP Patent Publication (Kokai) No. 2007-32326 A).

In addition, when much fuel is remained in the combustion chamber in a state of adhering to the crown surface of the piston and the wall surface of the cylinder bore, graphite is generated, and the number of particle matter, so-called Particulate Matter (hereinafter referred to as PM) particles to be discharged tends to increase. Here, Number of particles means the total number of PM particles to be discharged when driving a vehicle with a predetermined driving pattern. Particularly, when much fuel adheres to the crown surface of the piston, Number of particles tends to increase. In recent years, there has been growing need to reduce Number of particles with respect to engines for vehicles and in particular, to direct injection type engines.

SUMMARY OF THE INVENTION

If assuming a timing of fuel injection as an intake stroke in a direct injection type engine, when the timing of fuel injection is relatively advanced, an amount of fuel that adheres to the crown surface of the piston increases, and Number of particles tends to increase. Meanwhile, when retarding the injection timing in order to reduce the amount of fuel that adheres to and that remains on the crown surface of the piston so as to suppress the increase of Number of particles, an amount of fuel increases that adheres to and that remains on the wall surface of the cylinder bore, and an unburned gas tends to increase.

The above-described problems are similarly true for a case of split multi-stage injection in which plural fuel injections are carried out in one cycle, and additionally, since intervals between injections are needed in the split multi-stage injection, an injection end timing is on a more retarded angle side as compared with a case of only one time fuel injection in one cycle. When an end timing of a split last injection is on a more retarded angle side than a predetermined crank angle, there is a case that fuel cannot vaporize sufficiently before ignition, and therefore a degree of homogeneity of an air-fuel mixture in the cylinder tends to deteriorate.

An object of the present invention is to provide a control apparatus for a direct injection type engine that reduces an amount of fuel that adheres to and that remains on a crown surface of a piston so as to suppress the increase of Number of particles as well as advancing the first injection as much as possible when plural fuel injections are carried out in one cycle in the direct injection type engine.

In order to achieve such object, the present invention provides a control apparatus for an internal combustion engine comprising a fuel injection valve that injects fuel into a combustion chamber by controlling a drive current based on an injection pulse width, wherein split multi-stage injection control is performed that carries out plural fuel injections in which at least the first injection is performed during an intake stroke, and when an injection pulse width of the first injection is short, an injection timing of the first injection is set based on the injection pulse width of the first injection so that the injection timing of the first injection is more advanced as compared with a case of a longer injection pulse width of the first injection.

According to the present invention, split multi-stage injection can be carried out at an injection timing when the amount of fuel can be reduced that adheres to and that remains on the crown surface of the piston, thus enabling the engine to suppress the increase of Number of particles.

Particularly, when the internal combustion engine is started to be cooled, a temperature of the crown surface of the piston is lower as compared with the time of warming-up of the engine, thus enabling to obtain a greater effect.

BRIEF DESCRIPTION OF THE DRAWINGS

FIG. 8 is a flow chart showing a control content of split multi-stage injection control for a direct injection type engine according to one embodiment of the present invention.

DETAILED DESCRIPTION OF THE PREFERRED EMBODIMENTS

Hereinafter, embodiments of the present invention will be described in detail using FIGS. 1 to 24.

Figure 1:
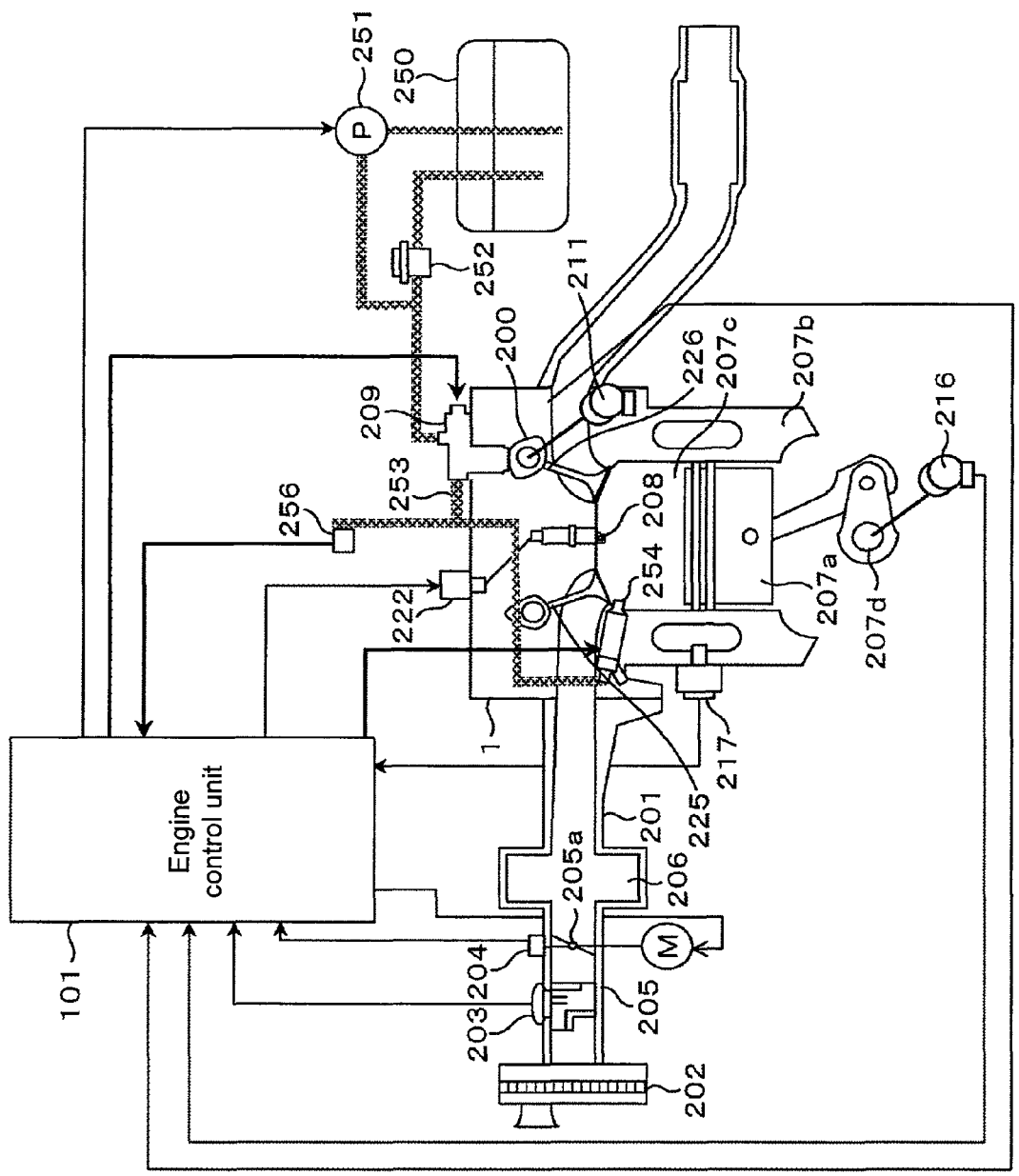
FIG. 1 is a schematic diagram of a configuration of a whole control system for a direct injection type engine according to one embodiment of the present invention.

First, using FIG. 1, there will be described an outline of a configuration of a whole control system for a direct injection engine 1 according to one embodiment of the present invention.

The direct injection engine 1 is comprised of four cylinders. Only one cylinder is shown in FIG. 1 for simplification. Each cylinder has a cylinder 207b, and air introduced into the cylinder 207b is taken in from an inlet of an air cleaner 202, passes through an air meter (an air flow sensor 203), and enters a collector 206 through a throttle body 205 in which an electrically controlled throttle valve 205a for controlling an intake flow rate has been housed. The air suctioned into the collector 206 is guided to a combustion chamber 207c formed of a piston 207a, the cylinder 207b, etc. after being distributed to each intake pipe 201 connected to the each cylinder 207b of the direct injection engine 1. In addition, a signal indicating the intake flow rate is output from the air flow sensor 203 to an engine control unit 101 that has a control apparatus for a high pressure fuel pump according to the present embodiment. Further, a throttle sensor 204 that detects an opening of the electrically controlled throttle valve 205a is attached to the throttle body 205, and a signal from the throttle sensor 204 is also output to the engine control unit 101.

Meanwhile, as well as being primarily pressurized by a low pressure fuel pump 251 from a fuel tank 250, and being adjusted to a fixed pressure (for example, 0.3 MPa) by a fuel pressure regulator 252, fuel, such as gasoline, is secondarily pressurized to a higher pressure (for example, 5 MPa or 10 MPa) by a high pressure fuel pump 209 that will be described hereinafter, and then it is injected to the combustion chamber 207c from a fuel injection valve (hereinafter referred to as an injector 254) provided at the cylinder 207b through a fuel rail 253. The fuel injected to the combustion chamber 207c is ignited by a spark plug 208 with an ignition signal whose voltage is made to be high by an ignition coil 222. It is to be noted that although the injector 254 is the injector employing a side injection system in which fuel is injected from each cylinder 207b side of the direct injection engine 1 in the present embodiment, a center injection system may be employed in which fuel is injected from right above the combustion chamber 207c.

A crank angle sensor 216 attached to a crankshaft 207d of the direct injection engine 1 outputs a signal indicating a rotational position of the crankshaft 207d to the engine control unit 101, and additionally, it is provided with a mechanism that makes variable an opening and closing timing of an intake valve 225 and with a mechanism that makes variable an opening and closing timing of an exhaust valve 226. A cam angle sensor 211 attached to a camshaft (not shown) provided with a mechanism that makes variable the opening and closing timing of the exhaust valve 226 outputs to the engine control unit 101 an angle signal indicating a rotational position of a pump drive cam 200 of the high pressure fuel pump 209 that rotates along with a rotation of the camshaft of the exhaust valve 226 as well as outputting an angle signal indicating a rotational position of the camshaft to the engine control unit 101.

It is to be noted that although the direct injection engine 1 with four cylinders is described in the present embodiment, an engine with other number of cylinders, such as three or six cylinders, may be employed.

In addition, although both the intake valve 225 and the exhaust valve 226 are provided with the variable mechanisms for the opening and closing timing, respectively in the present embodiment, a configuration may be employed in which only the opening and closing timing of the intake valve 225 is variable as a variable valve mechanism, or a mechanism may be used in which an amount of valve lift is variable in addition to the opening and closing timing.

Figure 2:
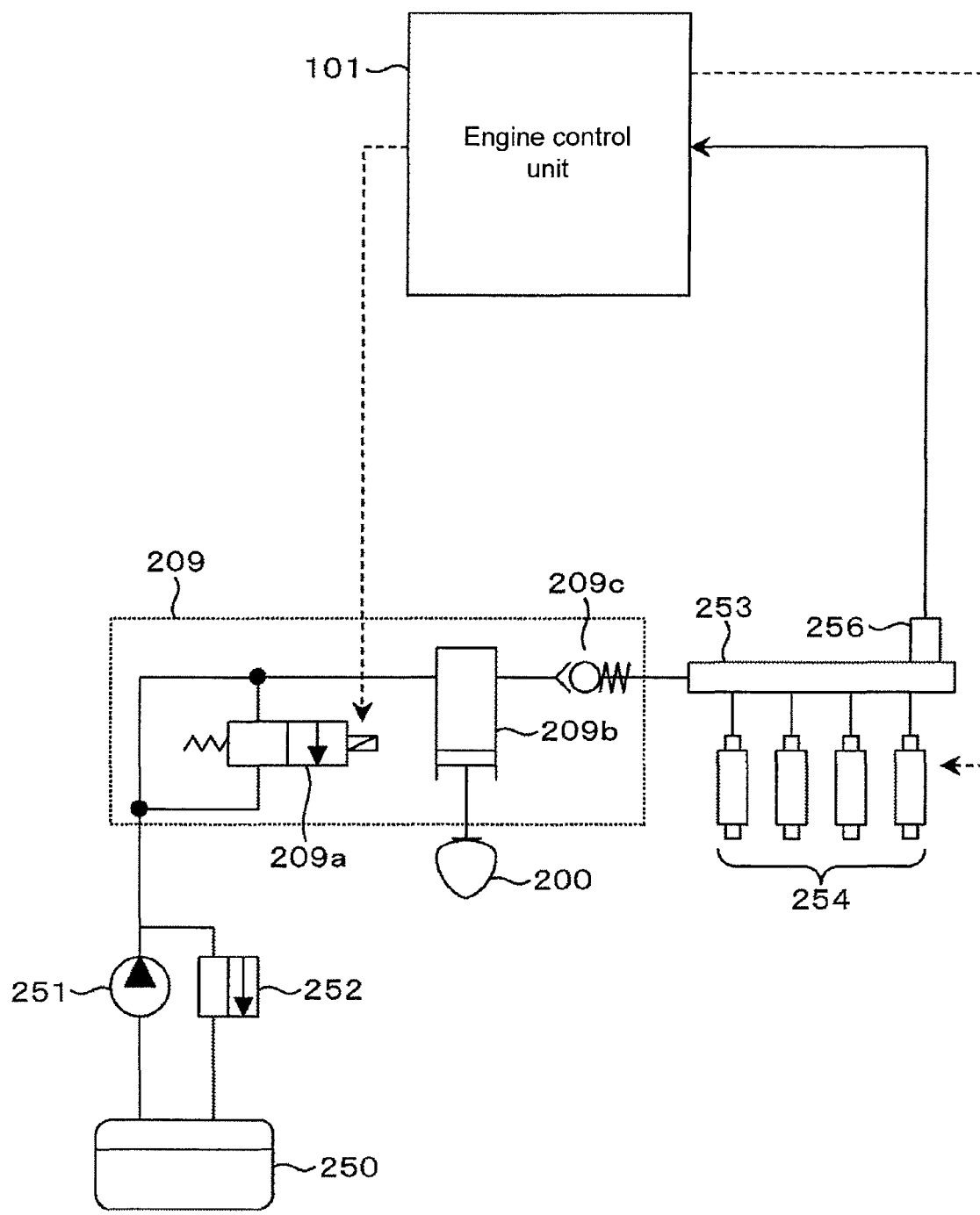
FIG. 2 is a schematic diagram of a configuration of a whole fuel system for a direct injection type engine according to one embodiment of the present invention.

FIG. 2 shows a schematic diagram of a configuration of a whole fuel system provided with a high pressure fuel pump 209.

The high pressure fuel pump 209 pressurizes fuel from the fuel tank 250 to feed high-pressure fuel to the fuel rail 253.

The fuel is guided to a fuel introduction port of the high pressure fuel pump 209 from the tank 250 by the low pressure fuel pump 251 after being adjusted to a fixed pressure by the fuel pressure regulator 252. A pump solenoid 209a, which is an electromagnetic control valve for controlling a fuel suction amount, is provided at a fuel introduction port side. The pump solenoid 209a is a normal close type solenoid, and it is closed when not energized and opened when energized. A suction amount of the fuel supplied by the low pressure fuel pump 251 is adjusted by controlling the pump solenoid 209a with the engine control unit 101, and the fuel is pressurized in the pump drive cam 200 and a pressurization chamber 209b to be fed to the fuel rail 253 from a fuel discharge port. A discharge valve 209c is provided at the fuel discharge port in order not to make high-pressure fuel of a downstream side flow backward to the pressurization chamber. Attached to the fuel rail 253 is a pressure sensor 256 for measuring a pressure of fuel (hereinafter referred to as a fuel pressure) in the injector 254 and the fuel rail 253.

Figure 3:
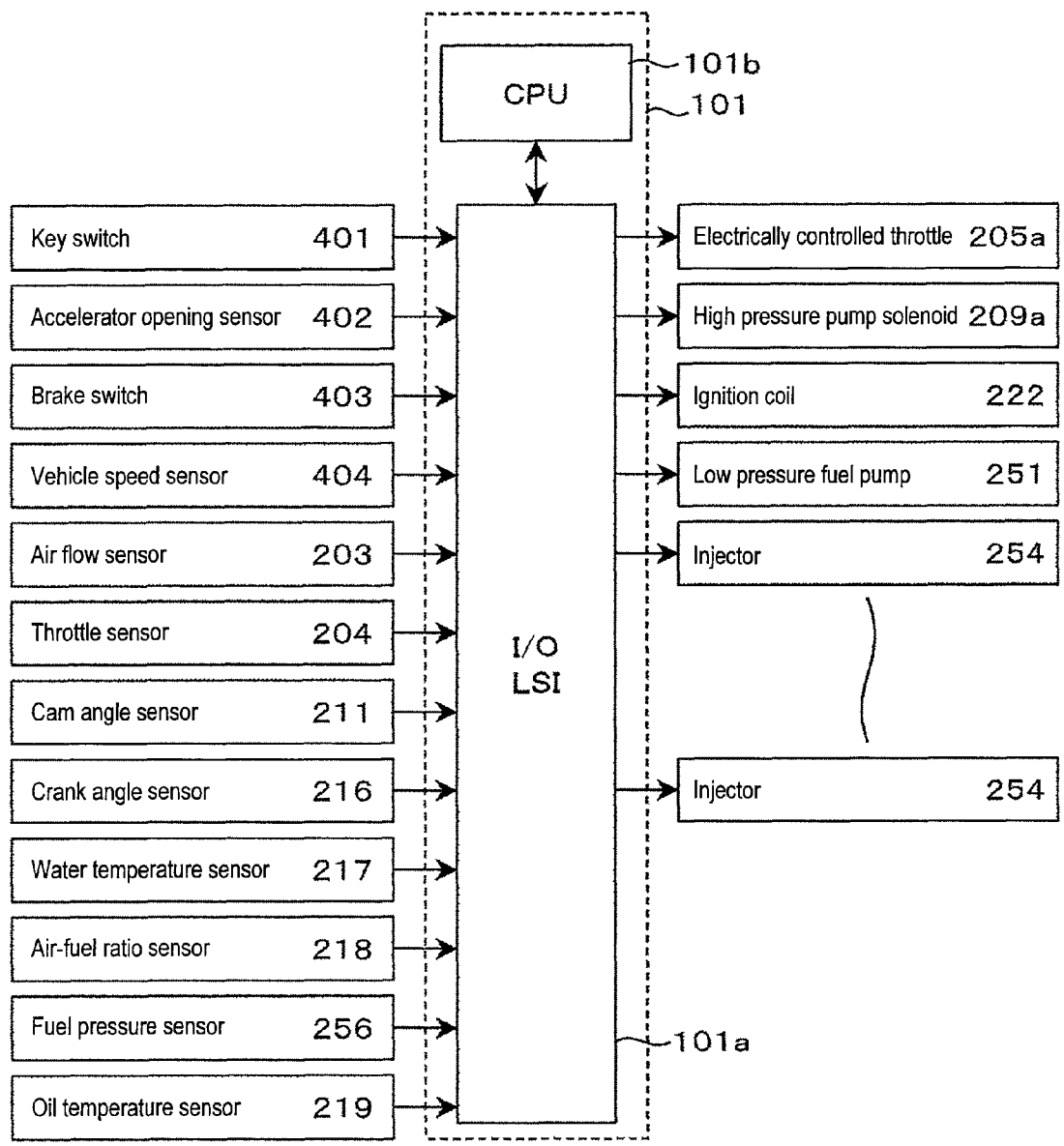
FIG. 3 is a block diagram showing a relation of input/output signals of an engine control unit that is used in a system configuration showing one embodiment of a control apparatus for a direct injection type engine according to one embodiment of the present invention.

An input/output relation of the engine control unit 101 is shown in FIG. 3. The engine control unit 101 is comprised of an I/O LSI101a, a CPU 101b, etc. including an A/D converter, takes in as inputs a signal of a key switch 401 indicating accessories, ignition ON, and starter ON, and signals from various sensors etc. including an accelerator opening sensor 402, a brake switch 403, a vehicle speed sensor 404, the air flow sensor 203, the throttle sensor 204, the cam angle sensor 211, the crank angle sensor 216, a water temperature sensor 217, an air-fuel ratio sensor 218, the pressure sensor 256, and an oil temperature sensor 219, executes predetermined arithmetic processing, outputs various kinds of control signals calculated as arithmetic results, supplies predetermined control signals to the electrically controlled throttle valve 205a as an actuator, the pump solenoid 209a, the ignition coil 222, the low pressure fuel pump 251, and the injector 254, and carries out fuel pressure control, fuel injection amount control, ignition timing control, etc. in the fuel rail 253. The I/O LSI101a is provided with a drive circuit that drives the injector 254, boosts a voltage supplied from a battery using a booster circuit (not shown) to then supply, and drives the injector 254 by controlling a current with an IC (not shown).

Next, using FIGS. 4 to 7, there will be described penetration (penetration force) of fuel to be injected from the injector 254, i.e., fuel reach distances.

Figure 4:
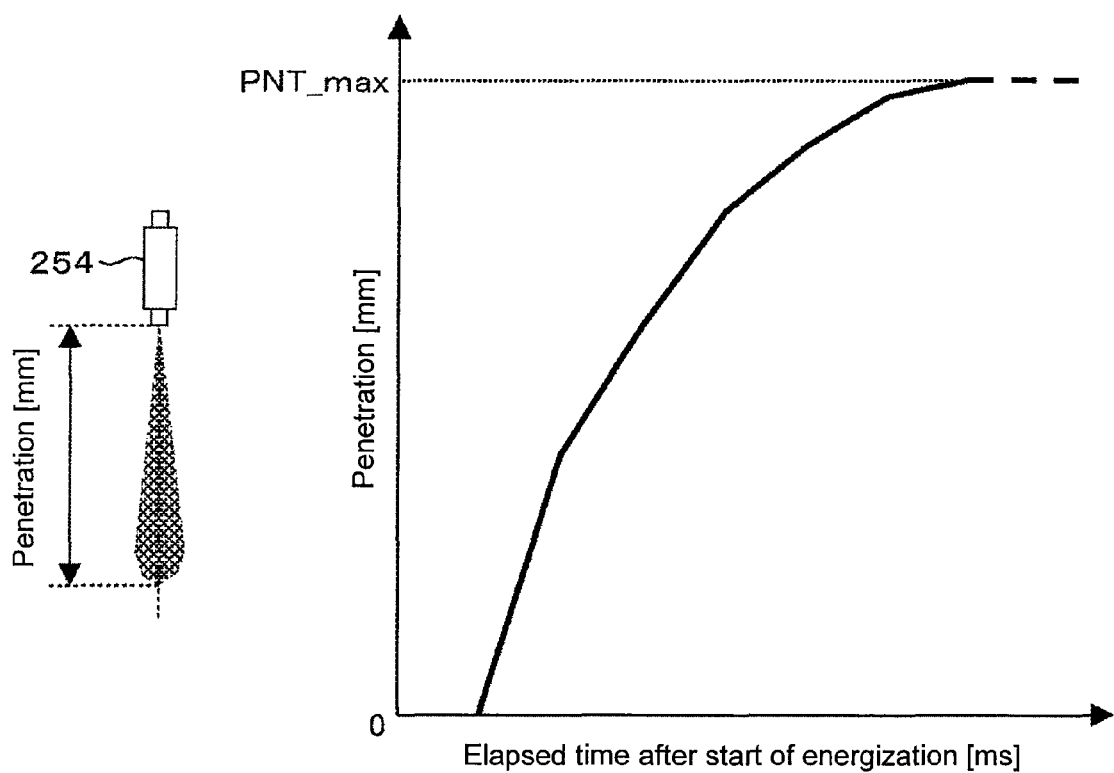
FIG. 4 is a graph showing relations between elapsed times after the start of energization of an injector and reach distances (penetration) of injected fuel when using a fuel system for a direct injection type engine according to one embodiment of the present invention.

FIG. 4 shows relations between elapsed times after the start of injection, i.e., after the start of energization and reach distances (penetration) of injected fuel when fuel is injected from the injector 254 with a predetermined fuel pressure and a predetermined injection pulse width. Penetration is 0 since valve opening of the injector 254 is retarded immediately after the start of energization, and it gradually becomes large after the elapse of a predetermined time period. After the elapse of a certain time period, penetration converges due to vaporization of the injected fuel (a dashed line shown in FIG. 4). A maximum value of penetration in this case is PNT_max.

Figure 5:
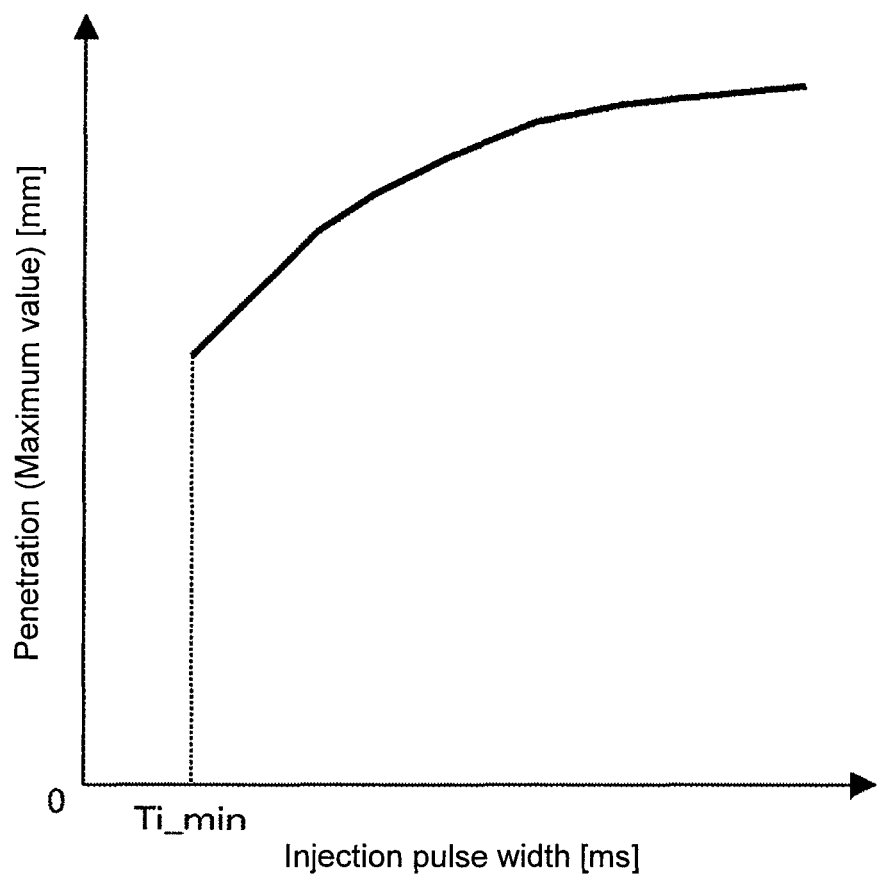
FIG. 5 is a graph showing relations between injection pulse widths of an injector and maximum values of penetration of injected fuel when using a fuel system for a direct injection type engine according to one embodiment of the present invention.

FIG. 5 shows maximum values of penetration for every injection pulse width, i.e., relations of penetration corresponding to PNT_max in FIG. 4 when fuel is injected from the injector 254 with a predetermined fuel pressure under an environment of a predetermined back pressure. When the injection pulse width is short, i.e., when fuel is injected a little, the maximum value of penetration is small, and when long, it is large. Here, Ti_min is a minimum pulse width, and a value of penetration is the smallest when the injection pulse width is Ti_min.

Figure 6:
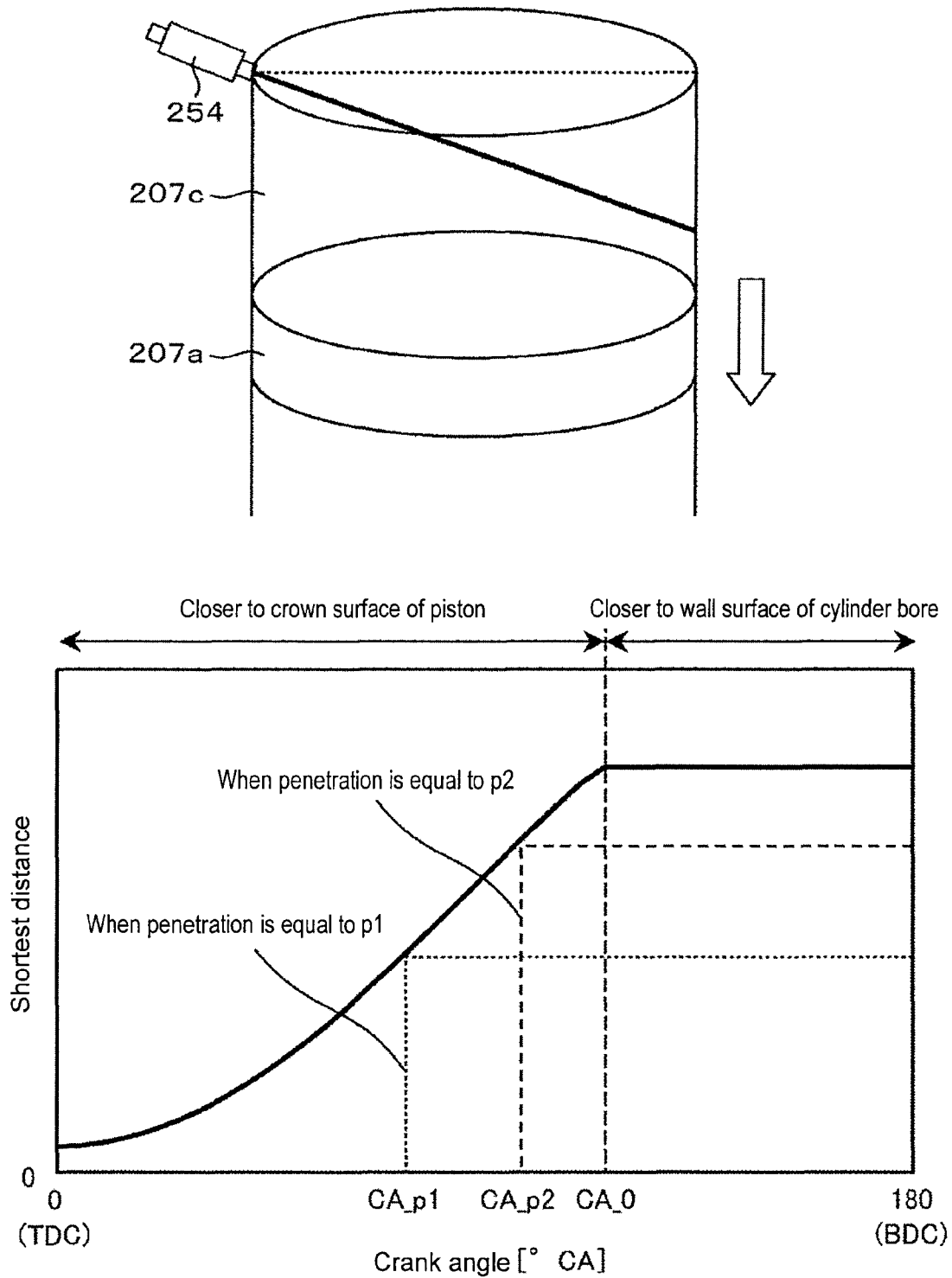
FIG. 6 is a graph showing relations of the shortest distances from an injection port of an injector in which fuel to be injected is injected in one direction when fuel is injected into a combustion chamber from the injector while a piston moves from a top dead center to a bottom dead center.

FIG. 6 shows relations of the shortest distances from an injection port of the injector 254 to a crown surface of a piston or a cylinder bore when fuel is injected into the combustion chamber 207c from the injector 254 while the piston 207a moves from a TDC (top dead center) to a BDC (bottom dead center). In FIG. 6, a case where fuel is injected from the injector 254 in one direction is illustrated as an example for simplification. When a crank angle is 0 (the piston 207a is in the TDC), the shortest distance is short since the crown surface of the piston 207a is the closest to the injection port of the injector 254, and the shortest distance gradually becomes large since the piston 207a moves from the TDC to the BDC as the crank angle is advanced. When the crank angle is not less than CA_0, the piston 207a further moves away from the injection port of the injector 254, but the shortest distance becomes constant since a wall surface of the cylinder bore becomes closer to the injection port of the injector 254.

Here, for example, if penetration of the fuel injected from the injector 254 (a maximum value of a fuel reach distance) is large, when the fuel is injected on a more advanced angle side (TDC side) than the crank angle CA_0, it reaches the crown surface of the piston, and when injected on a more retarded angle side (BDC side) than the crank angle CA_0, it reaches the wall surface of the cylinder bore. However, when penetration of the fuel injected from the injector 254 (maximum value of the fuel reach distance) is p1, if injection is started when the crank angle is not less than CA_p1, fuel will not reach either the crown surface of the piston or the wall surface of the cylinder bore. In addition, for example, when penetration of the fuel injected from the injector 254 is p2, if injection is started when the crank angle is not less than CA_p2, fuel will not reach either the crown surface of the piston or the wall surface of the cylinder bore. For example, if penetration is p1 when fuel is injected with a minimum injection pulse width, and also if penetration is p1 when injected with an injection pulse width per one time obtained by splitting with a predetermined split ratio, injection may be started when the crank angle is not less than CA_p1, and if penetration is p2 when injected with the injection pulse width per one time obtained by splitting with the predetermined split ratio, injection may be started when the crank angle is not less than CA_p2.

Figure 7:
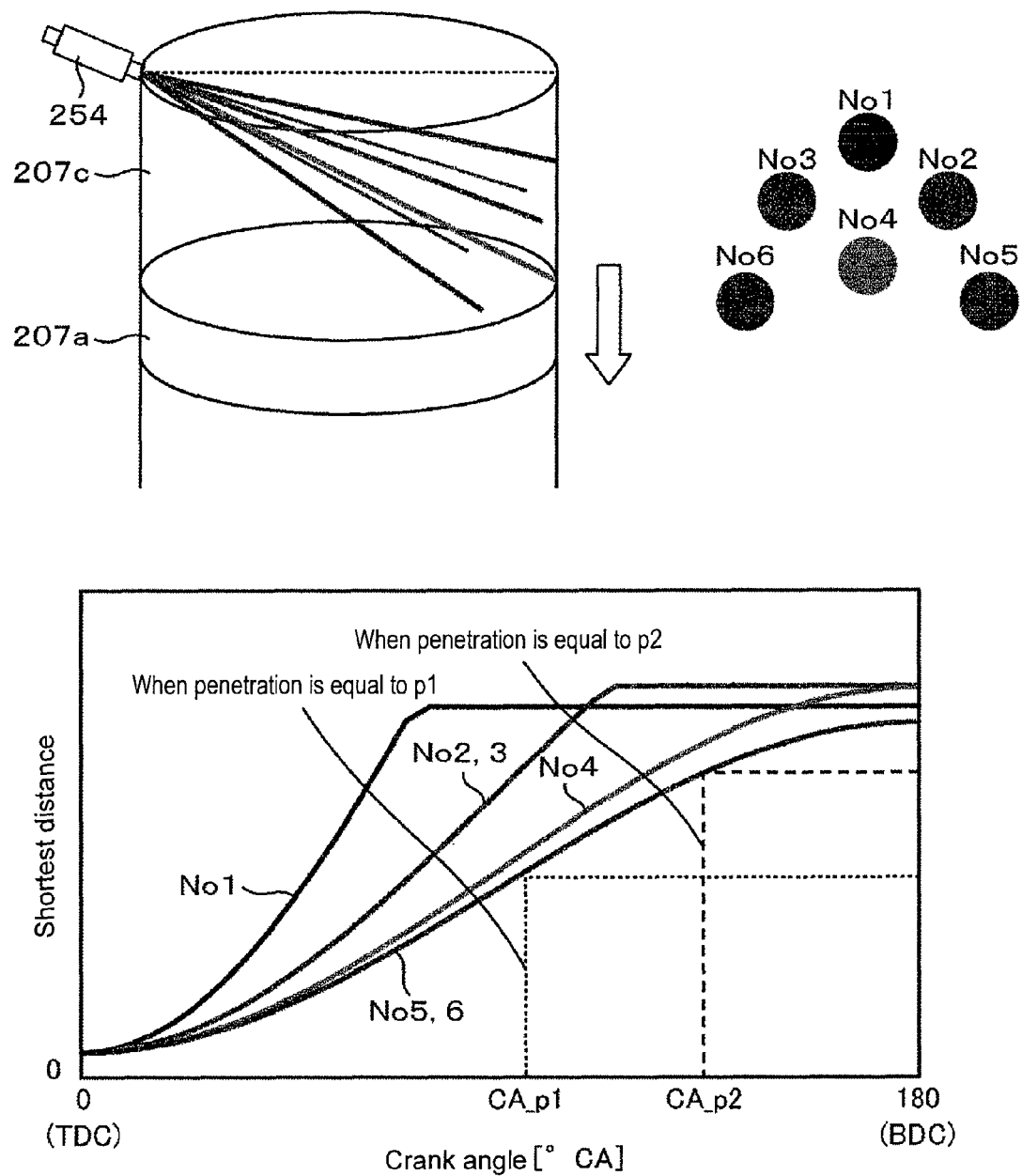
FIG. 7 is a graph showing relations of the shortest distances from an injection port of a multihole injector in which fuel to be injected is injected in a plurality of directions when fuel is injected into a combustion chamber from the injector while a piston moves from a top dead center to a bottom dead center.

FIG. 7 shows relations of the shortest distances from the injection port of the injector 254 when fuel is injected into the combustion chamber 207c from the injector 254 while the piston 207a moves from the TDC (top dead center) to the BDC (bottom dead center) in a case of using a so-called multihole injector as the injector 254 from which the fuel is injected in a plurality of directions. A case where six beams are injected is illustrated in FIG. 7 as an example of the multihole injector.

When the crank angle is 0 (the piston 207a is in the TDC), the shortest distance of any beam is short since the crown surface of the piston 207a is the closest to the injection port of the injector 254, and the shortest distance of each beam gradually becomes large since the piston 207a moves from the TDC to the BDC as the crank angle is advanced. Here, the shortest distances of the beams are different from each other since fuel is injected in the plurality of directions in the multihole injector, and since, for example, beam No1 is injected in the most upward direction, i.e., it is injected in a direction near a parallel surface to the crown surface, increase of the shortest distance becomes larger as the crank angle is advanced, and conversely, since, for example, beams No5 and 6 are injected in the most downward direction, i.e., they are injected in a direction near a vertical surface to the crown surface, increase of the shortest distance becomes smaller as the crank angle is advanced. When the crank angle becomes not less than a predetermined value, the wall surface of the cylinder bore becomes closer to the injection port of the injector 254 although the piston 207a further moves away from the injection port of the injector 254, whereby the shortest distances of the respective beams become constant.

Here, similarly to the case in FIG. 6, for example, when penetration of the fuel injected from the injector 254 (maximum value of the fuel reach distance) is p1, if injection is started when the crank angle is not less than CA_p1, fuel of any beam will not reach either the crown surface of the piston or the wall surface of the cylinder bore. In addition, for example, when penetration of the fuel injected from the injector 254 is p2, if injection is started when the crank angle is not less than CA_p2, fuel of any beam will not reach either the crown surface of the piston or the wall surface of the cylinder bore. The following embodiment will be described a case as an example where the multihole injector is used as the injector 254.

Geometric distances are shown in both FIGS. 6 and 7, and actual combustion is influenced by an intake air flow in the combustion chamber 207c, but fuel injections are carried out by splitting the fuel to be injected in one cycle into fuel for plural injections, and a crank angle at which fuel is injected is selected depending on penetration of split each injection pulse width (maximum value of the fuel reach distance), or each injection pulse width is selected so that the penetration can be a permitting length depending on the injection crank angle, whereby an amount of fuel that adheres to the crown surface of the piston or the wall surface of the cylinder bore can be significantly reduced.

Next, using FIGS. 8 to 17, there will be described a specific control content of split multi-stage injection control for an internal combustion engine according to the present embodiment.

FIG. 8 is a flow chart showing a control content of split multi-stage injection control according to one embodiment of the present invention.

A content of FIG. 8 is programmed by the CPU 101b of the engine control unit 101, and repeatedly executed in a predetermined cycle. Namely, processing of the following Steps 801 to 803 is repeatedly executed in the cycle predetermined by the engine control unit 101. The engine control unit 101 supplies a predetermined control signal to each injector 254 based on an injection pulse width and an injection timing that are calculated with the processing content of FIG. 8, and then carries out plural fuel injections in one cycle.

At Step 801, a total injection pulse width Ti_all, which is a total amount of fuel injected from each injector in one cycle, is set. The total injection pulse width Ti_all is set depending on an intake air amount measured by the air flow sensor 203, an air-fuel ratio set depending on an operational state etc., a fuel pressure that are calculated using a signal of the pressure sensor 256, etc.

At Step 802, a minimum injection pulse width Ti_min is calculated. The minimum injection pulse width Ti_min is, as shown in FIG. 8B, calculated with reference to a function Fmin in which a fuel pressure Pf calculated using the signal of the pressure sensor 256 is set as an input. Here, since the minimum injection pulse width depends on an electric property and a mechanical property of the injector 254, and a drive current waveform thereof, it is preferable that the function Fmin is set in view of various characteristics.

Figure 9:
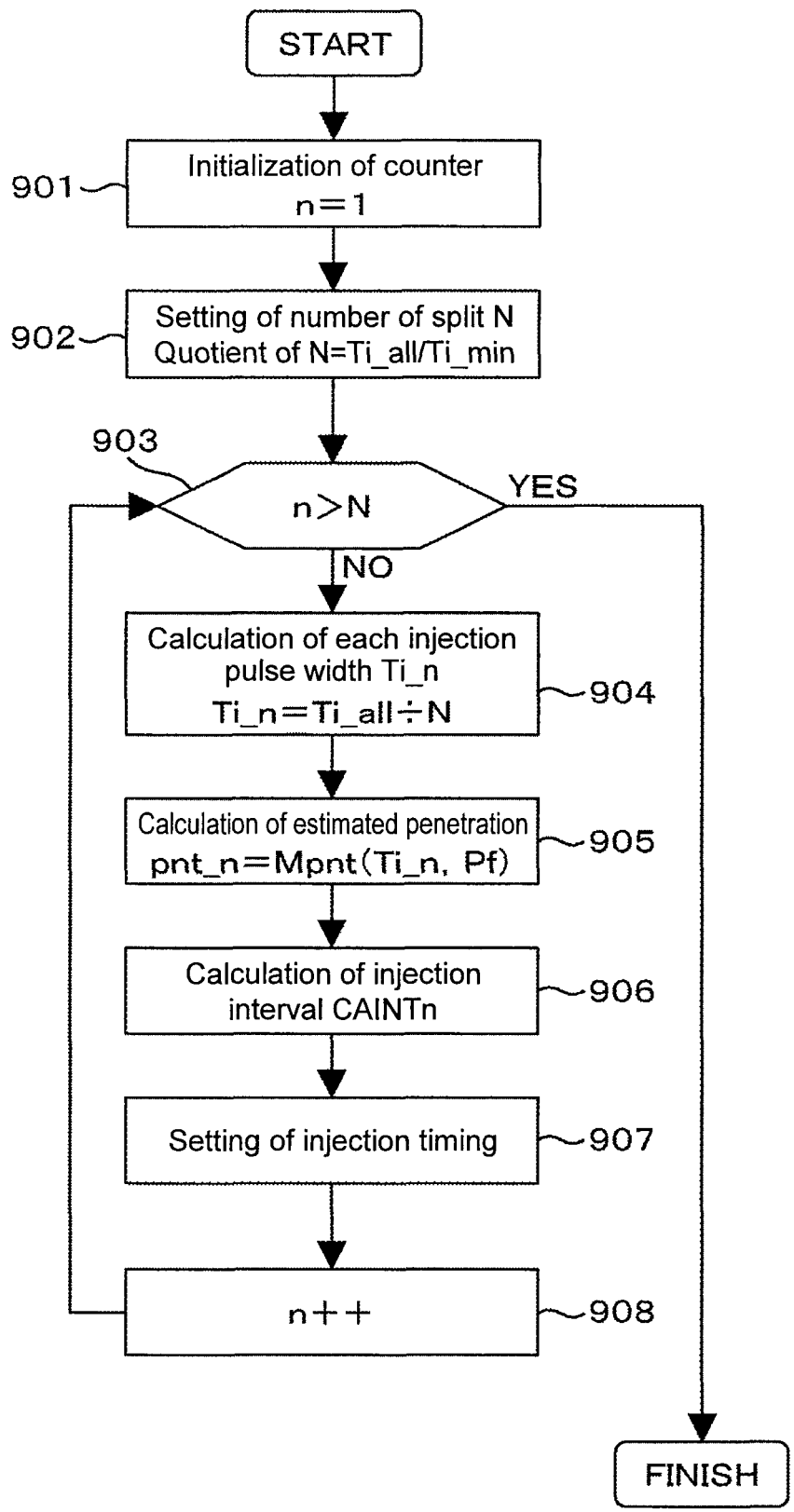
FIG. 9 is a flow chart showing a processing content of setting of split injections shown in FIG. 8.

At Step 803 (setting of split injections), each injection pulse width and each injection timing of split multi-stage injection are set. The details of Step 803 are shown in FIG. 9.

Next, the details of Step 803 (setting of split injections) in FIG. 8 will be described using FIG. 9. FIG. 9 is a control flow chart of a control system in which the number of split of the split injections in one cycle is set first, and then each injection pulse width and each injection timing are set. If the number of split is set as N, each injection pulse width and each injection timing of n=1 to N are set.

At Step 901, a counter is initialized.

At Step 902, the number of split N is set. Division of Ti_all÷Ti_min is carried out using the total injection pulse width Ti_all and the minimum injection pulse width Ti_min that have been set at Steps 801 and 802 in FIG. 8, respectively, and a quotient of the division is set as the number of split N. For example, when Ti_all is 1.0 millisecond, and Ti_min is 0.3 millisecond, it holds that Ti_all÷Ti_min=3.33 . . . , and thus a quotient thereof is 3, i.e., N=3.

At Step 903, it is determined whether or not a counter n is larger than the number of split N, and if it is larger (if settings of n=1 to N are completed), processing is terminated. If the counter n is not more than the number of split N, processing of Step 904 or later is performed.

At Step 904, an injection pulse width Ti_n (n=1 to N) of each injection is calculated. Although the injection pulse width Ti_n is calculated by carrying out Ti_all÷N at Step 904, specifically, in order to prevent cancellation of significant digits, for example, when Ti_all is 1.0 millisecond, and the number of split N=3, it is preferable to perform processing for preventing cancellation of significant digits, such as Ti_1=0.33, Ti_2=0.33, and Ti_3=0.34. Alternatively, processing may be performed that a split ratio is set, prevention of cancellation of significant digits is incorporated in the calculation of the split ratio in advance, and then the injection pulse width Ti_n is calculated.

Figure 10:
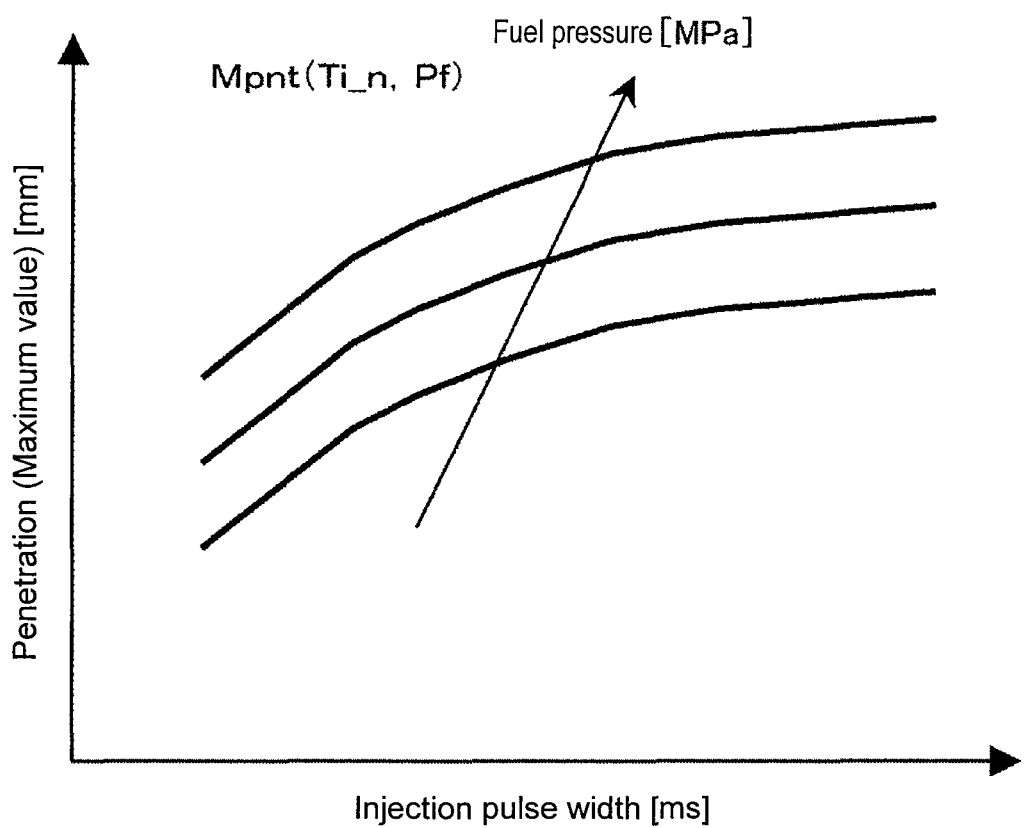
FIG. 10 is a graph showing a map function for calculating penetration (a maximum value of fuel reach distances) of each injection shown in FIG. 9.

At Step 905, penetration is estimated. Penetration (maximum value of the fuel reach distance) pnt_n of each split injection is calculated based on each split injection pulse width Ti_n and the fuel pressure Pf using a map structure as shown in FIG. 10. Although the map structure of the each injection pulse width Ti_n and the fuel pressure Pf are shown in FIG. 10, it is preferable to further detect or estimate an intake air temperature, and then to make a four-dimensional map structure of the each injection pulse width Ti_n, the fuel pressure Pf, and the air temperature. Further, when a supercharging system, such as a turbocharger or a supercharger, is mounted on the direct injection engine 1 etc., it is preferable to correct penetration estimated using an intake pipe pressure, a supercharging pressure, etc. in order to consider penetration change due to pressure change in the combustion chamber. Still further, since penetration changes also with a property of fuel, such as heavy or light, it is preferable to prepare a plurality of maps depending on fuel properties, to determine whether the fuel is heavy or light, and to shift or complement a map value retrieved based on the determination result.

At Step 906, an injection interval CAINTn, which is an injection interval of each split injection, is calculated. It is preferable that the injection interval is set as a maximum value of a plurality of conditions. One is a condition on penetration. Since penetration increases when reducing intervals between the each split injection pulse width Ti_n, the injection interval based on penetration is calculated by a function in which the fuel pressure Pf is set as an input. The second is a condition on a drive circuit that drives each injector 254 provided at the engine control unit 101. When the injector 254 is driven, a voltage boosted by the booster circuit provided at the engine control unit 101 decreases, and it takes time before returning to the original level of voltage again. This is a so-called recovery time for boost, and if the recovery time for boost is set as Tbst, it is necessary to take a predetermined time period after injection Ti_n of this time is completed in order to perform next injection Ti_(n+1). Namely, the injection interval is required by not less than Tbst−Ti_n. Hence, a maximum value of the injection interval based on penetration and the injection interval based on the recovery time for boost is set as a required injection interval TINTn, and the required injection interval TINTn is converted into a crank angle using an engine rpm Ne, whereby the injection interval CAINTn is calculated (interval [millisecond(s)]×engine rpm [r/min]×6÷1000=crank angle [° CA]). It is to be noted that when an injection interval is required in order to improve homogeneity of an air-fuel mixture, the present embodiment may be configured such that the third condition is added to select a maximum value, and then it is converted into a crank angle. Since homogeneity of the air-fuel mixture largely depends on an intake air flow, the present embodiment may be configured such that an injection interval based on homogeneity is calculated using the engine rpm Ne, or the opening and closing timing of the intake valve 225 and the exhaust valve 226.

Figure 11:
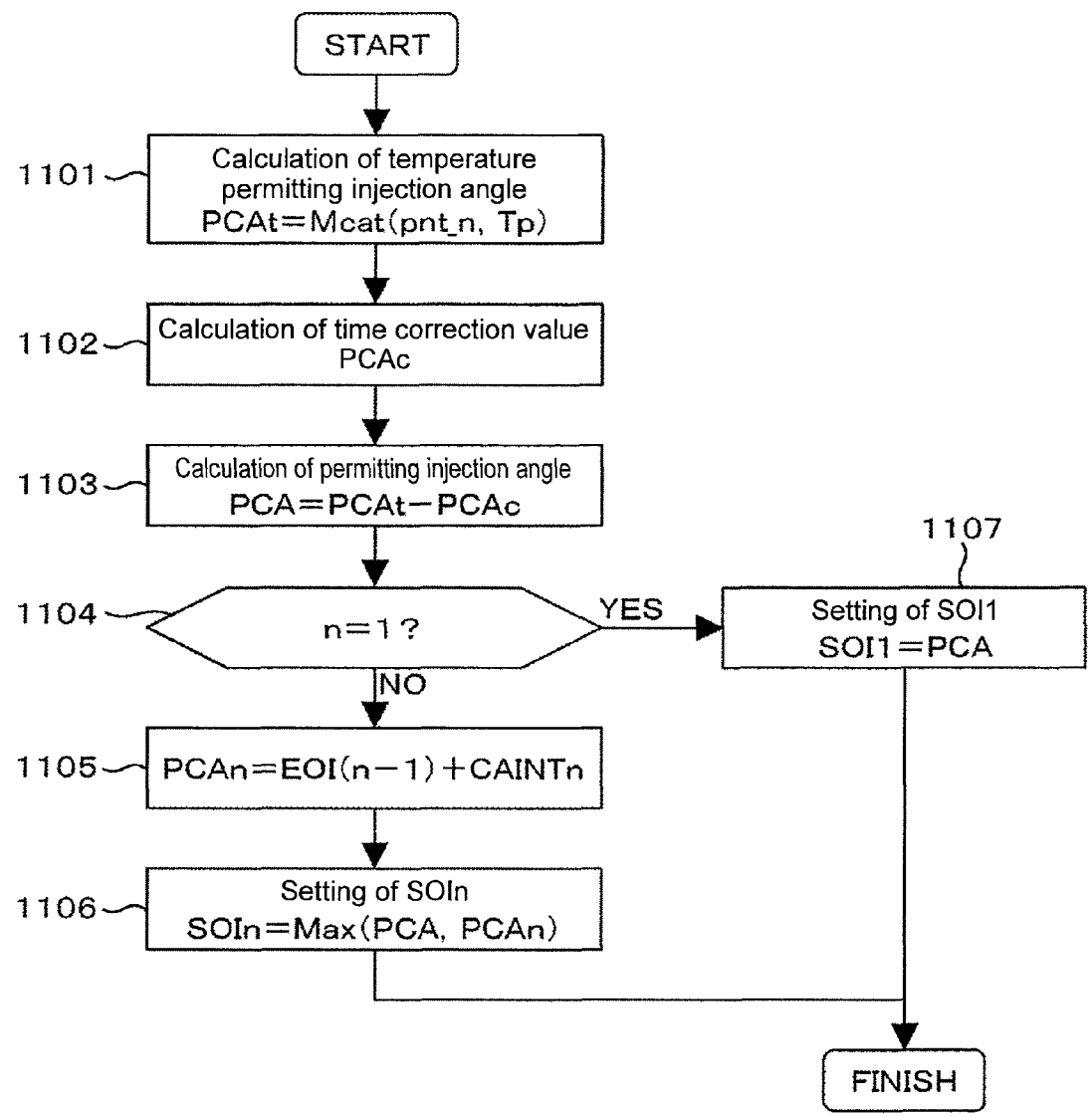
FIG. 11 is a flow chart showing a processing content of setting of an injection timing shown in FIG. 9.

At Step 907 (setting of an injection timing), an injection timing of each injection of the split multi-stage injection is set. The details of Step 907 are shown in FIG. 11.

At Step 908, increment processing of the counter n is performed, and the program returns to Step 903. Processing of n=1 to N is repeated as described above, and each injection pulse width and each injection timing are set.

Next, the details of Step 907 (setting of the injection timing) in FIG. 9 will be described using FIG. 11.

Figure 12:
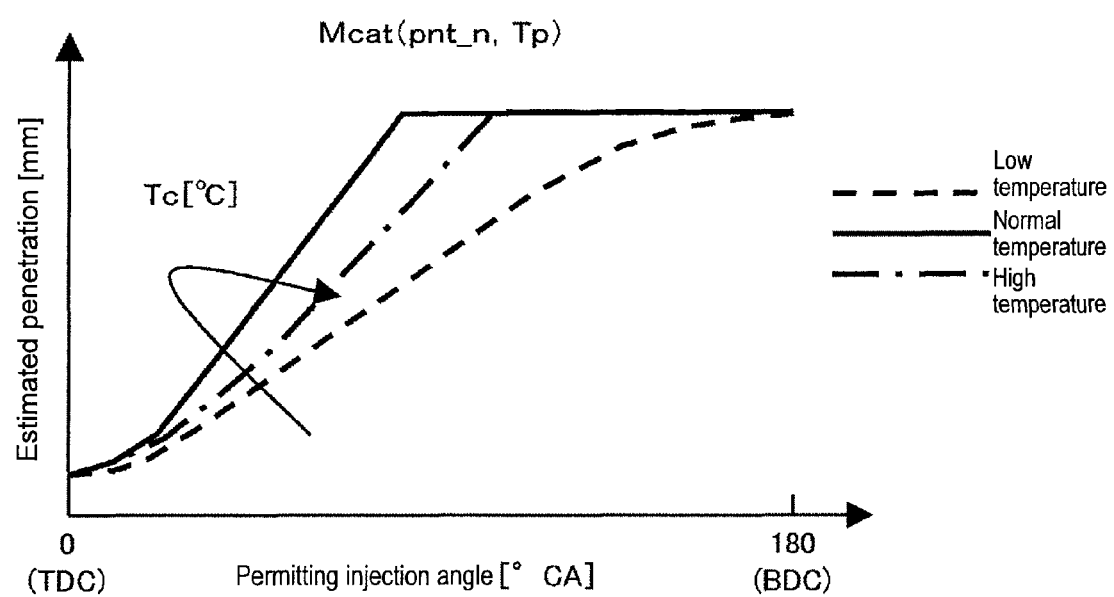
FIG. 12 is a graph showing a map function for calculating a temperature permitting injection angle PCAt shown in FIG. 11.

At Step 1101, calculated is an injection timing (a crank angle) on the most advanced angle side that can be permitted in the case of the penetration estimated at Step 905 in FIG. 9. A temperature permitting injection angle PCAt is calculated by referring to a map Mcat as shown in FIG. 12, estimated penetration pnt_n of the n-th injection and a temperature of the crown surface of the piston Tp being as inputs. The map Mcat is set based on arrangement of the injector 254 (arrangement with respect to the combustion chamber 207c), a direction of each beam injected from the injector 254, a bore of the combustion chamber 207c, and a stroke. Note that it is more suitable if a shape of the crown surface of the piston 207a is also taken into consideration for the setting. In addition, in the map Mcat, since vaporization of the fuel having adhered to the crown surface of the piston deteriorates when the temperature of the crown surface of the piston Tp is lower than the normal temperature, an injection permitting angle with respect to predetermined penetration is set on a retard angle side as a dashed line shown in FIG. 12, and since vaporization of the fuel having adhered to the crown surface is promoted when the temperature of the crown surface of the piston Tp is an appropriate one, the injection permitting angle with respect to the predetermined penetration is set on an advance angle side as a continuous line shown in FIG. 12. Meanwhile, when the temperature of the crown surface of the piston Tp becomes even higher than the normal temperature, it is preferable that the injection permitting angle with respect to the predetermined penetration is set on the retard angle side as a dashed-dotted line shown in FIG. 12 since a phenomenon that a layer of vaporized fuel (gas) is generated under fuel (liquid) to inhibit heat conduction, and that thereby the liquid is prevented from instantly vaporizing, so-called Leidenfrost phenomenon is generated when the fuel adheres to the crown surface.

In addition, although it is preferable to use a method for estimating the temperature of the crown surface Tp by estimating a combustion temperature using an air amount, an air-fuel ratio, an ignition timing, etc., and further by configuring a heat model using a water (coolant) temperature or an oil (lubricant) temperature detected by the water temperature sensor 217 or the oil temperature sensor 219, respectively, from the viewpoint of simplifying the control, the present embodiment may be configured such that the map Mcat is retrieved by setting a lower value of the two, which are the water temperature and the oil temperature detected by the water temperature sensor 217 and the oil temperature sensor 219, respectively, as an input value (an alternative of the crown surface temperature Tp). Alternatively, for further simplification, the present embodiment may be configured such that the map Mcat is retrieved by setting the water temperature detected by the water temperature sensor 217 as the input value.

In addition, although the map Mcat is configured by setting the estimated penetration pnt_n and the temperature of the crown surface of the piston Tp as inputs, it may be configured as a four-dimensional map by setting as inputs the estimated penetration pnt_n, the temperature of the crown surface of the piston Tp, and a temperature of the wall surface of the cylinder bore. Although it is preferable to use a method for estimating the temperature of the wall surface of the cylinder bore by estimating a combustion temperature using the air amount, the air-fuel ratio, the ignition timing, etc., and further by configuring a heat model using the water temperature detected by the water temperature sensor 217, from the viewpoint of simplifying control, the map Mcat may be configured as a four-dimensional map by setting as inputs the estimated penetration pnt_n, the oil temperature, and the water temperature.

At Step 1102, time delay until the injected fuel reaches is corrected. As shown in FIG. 4, penetration is 0 since valve opening of the injector 254 is delayed immediately after the start of energization, it gradually becomes larger after the elapse of a predetermined time period. Since a speed of fuel spray, i.e., change of penetration with respect to an elapsed time after the start of injection, depends on a fuel pressure, for example, time delay is set with a table function in which the fuel pressure Pf is set as an input, and the time delay is converted into a crank angle using the engine rpm Ne, whereby a time correction value PCAc is calculated (time [millisecond(s)]×engine rpm [r/min]×6÷1000=crank angle [° CA]).

At Step 1103, a permitting injection angle PCA is calculated by subtracting the time correction value PCAc from the temperature permitting injection angle PCAt. While considering reach time delay at Step 1103, can be calculated an injection timing (a crank angle) on the most advanced angle side that can be permitted in the case of the penetration estimated at Step 905 in FIG. 9.

At Step 1104, it is determined whether or not setting is the setting of the first injection timing of the split injections in one cycle. If n=1, the program proceeds to Step 1107, and then it terminates by setting that the first injection start timing SOI1 is equal to the permitting injection angle PCA. If n≠1 (in a case of the second or later injection timing), the program proceeds to Step 1105, and then an angle capable of starting the n-th injection PCAn is calculated. The angle capable of starting the n-th injection PCAn is calculated by adding the injection interval CAINTn calculated at Step 906 in FIG. 9 to the previous (the (n−1)th) injection end timing EOI (n−1). The previous (the (n−1)th) injection end timing EOI (n−1) is calculated by adding the converted crank angle value of the previous (the (n−1)th) injection pulse width $Ti_{(n-1)}$ to the previous (the (n−1)th) injection start timing SOI (n−1). Next, Step 1106 is executed, and (the n-th) injection start timing SOIn of this time is calculated. The n-th injection start timing SOIn is set as a larger value of the permitting injection angle PCA calculated at Step 1103 and the angle capable of starting the n-th injection PCAn calculated at Step 1105, i.e., as a value of the advance angle side. As a result of this, while ensuring the injection intervals of the split injections, can be set the injection timing that can be permitted in the case of the penetration of each injection estimated at Step 905 in FIG. 9.

Next, using FIGS. 13 to 16, there will be described a specific control example of split multi-stage injection control for the internal combustion engine when configured as shown in FIGS. 8 to 12.

Figure 13:
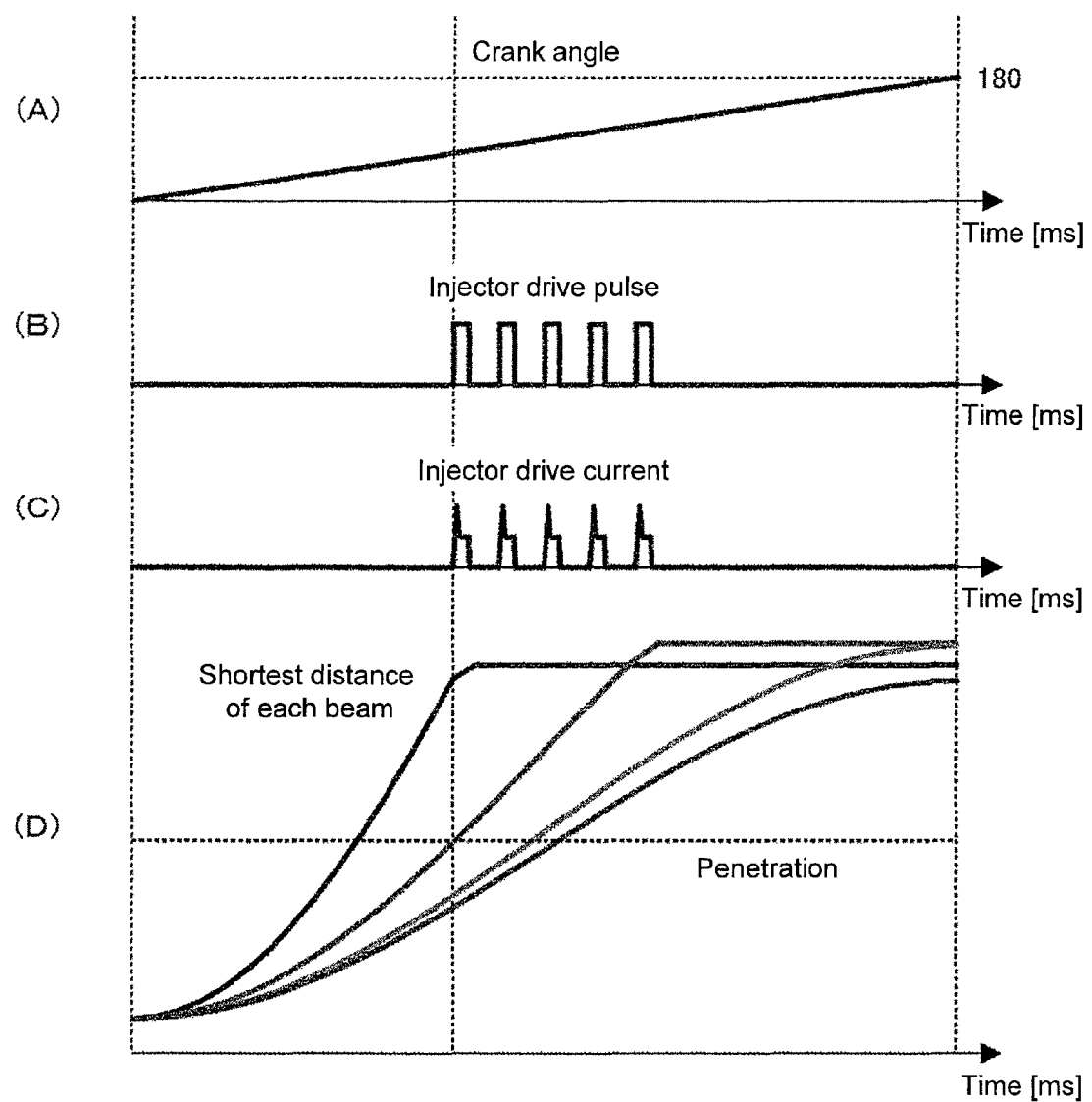
FIG. 13 is a time chart showing a first control example of split multi-stage injection control for a direct injection type engine according to one embodiment of the present invention.

FIG. 13 is a time chart when split injections are carried out five times in one cycle when the temperature of the crown surface of the piston Tp is an appropriate one (normal temperature), for example, when warming-up of the engine has been completed to be in normal operation.

In FIG. 13, there are shown crank angles in FIG. 13A, drive pulses of the injector 254 in FIG. 13B, drive currents of the injector 254 in FIG. 13C, and relations of the shortest distance of each beam from the injection port of the injector 254 in FIG. 13D. The crank angle in FIG. 13A increases from 0 to 180, and the shortest distance of the each beam in FIG. 13D becomes gradually larger. At Step 1101 in FIG. 11, the drive pulse of the injector 254 is generated five times at the timing that can permit penetration of each split injection when the temperature of the crown surface of the piston is the appropriate one, and split injections are carried out five times in the middle of the intake stroke.

Figure 14:
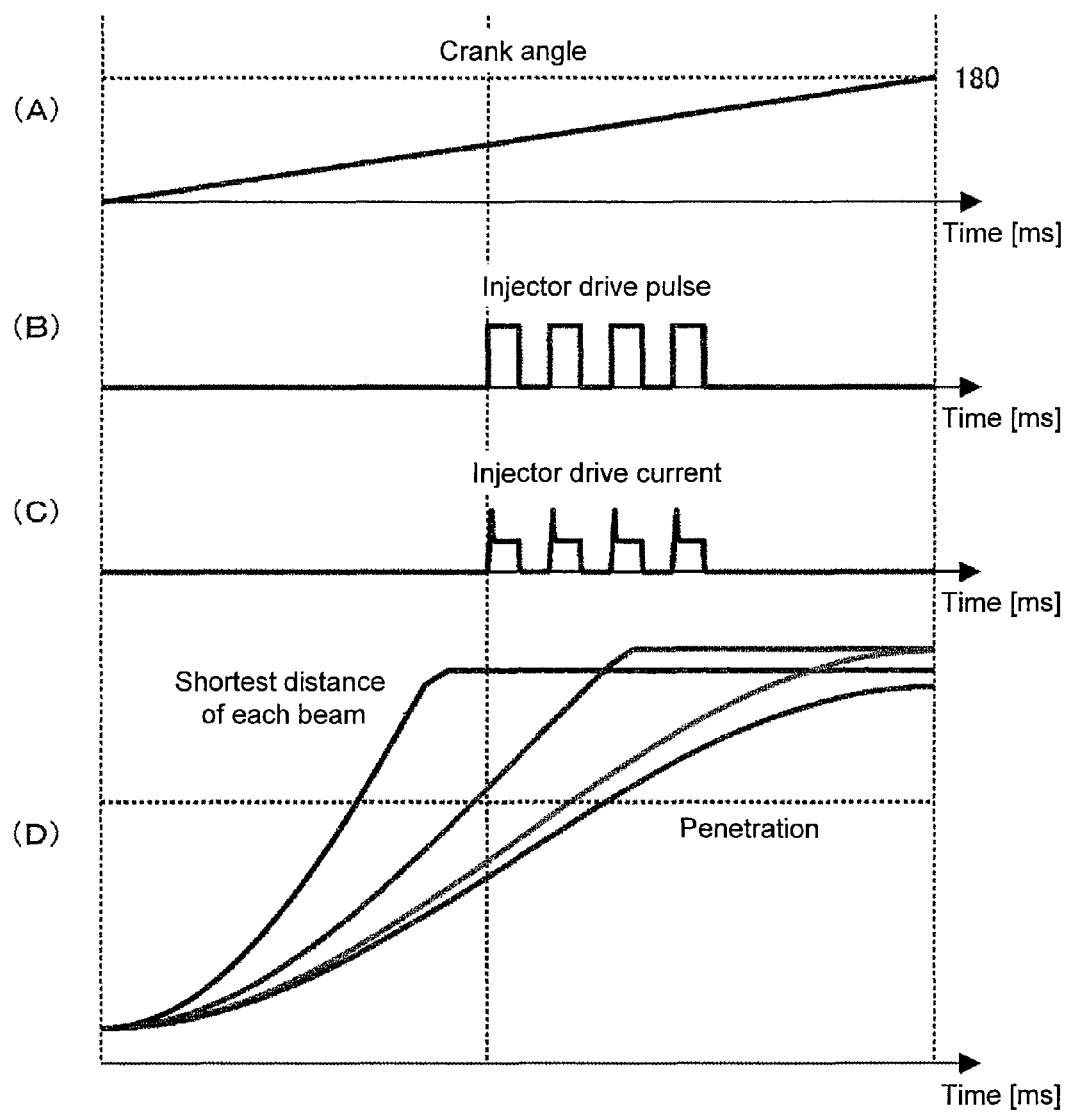
FIG. 14 is a time chart showing a second control example of split multi-stage injection control for a direct injection type engine according to one embodiment of the present invention.

FIG. 14 is a time chart when split injections are carried out four times in one cycle when the temperature of the crown surface of the piston Tp is the appropriate one, for example, when warming-up of the engine has been completed to be in normal operation. FIGS. 14A, 14B, 14C, and 14D are similar to FIGS. 13A, 13B, 13C, and 13D, respectively. Since the drive pulse (injection pulse width Ti_n) of the injector 254 is longer (penetration is longer) as compared with the case of FIG. 13, the injection start timing SOIn is set on a little more retarded angle side (BDC side) than the case of FIG. 13 by the processing shown in FIG. 11, and split injections are carried out four times.

Here, for example, when engine load is increased in a state where the temperature of the crown surface of the piston Tp is the appropriate one, for example, when warming-up of the engine has been completed to be in normal operation, the total injection pulse width Ti_all calculated at Step 801 in FIG. 8 also increases. When the fuel pressure Pf remains constant, the minimum injection pulse width Ti_min calculated at Step 802 in FIG. 8 is constant. Hence, when engine load is increased from low load to middle load and further to high load, for example, when the number of split N calculated at Step 902 in FIG. 9 is four at the time of low load, the injection pulse width Ti_n (n=1 to 4) of each injection calculated at Step 904 in FIG. 9 gradually increases as the engine load increases, and the number of split N calculated at Step 902 in FIG. 9 increases by one to be five when an increased amount of load becomes not less than a predetermined one. When engine load further increases, the injection pulse width Ti_n (n=1 to 5) of each injection calculated at Step 904 in FIG. 9 gradually increases. As a result of it, the estimated penetration pnt_n calculated at Step 905 in FIG. 9 becomes gradually large as the engine load gradually increases from low load, once becomes small when the number of split increases by one, and becomes gradually large as the engine load further gradually increases. When each injection start timing SOIn eventually set in FIG. 11 is an injection timing shown in FIG. 14 at the time of low load, it gradually becomes to be a more retarded angle side than the injection timing in FIG. 14 as the engine load gradually increases from low load, becomes to be an injection timing shown in FIG. 15 when the number of split increases by one, and becomes to be a more retarded angle side than the injection timing shown in FIG. 15 as the engine load further gradually increases.

Figure 15:
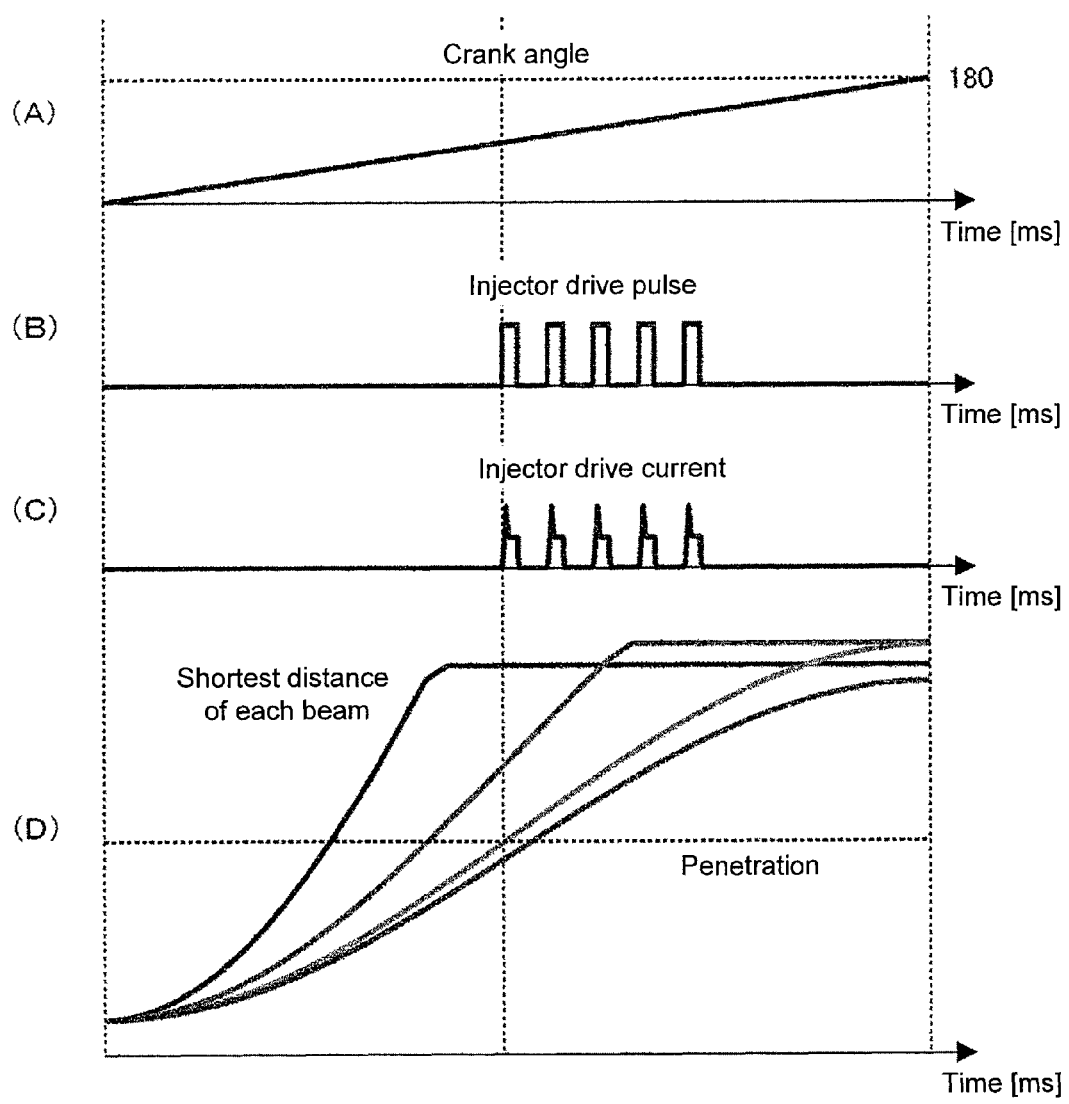
FIG. 15 is a time chart showing a third control example of split multi-stage injection control for a direct injection type engine according to one embodiment of the present invention.

FIG. 15 is a time chart when split injections are carried out five times in one cycle when the temperature of the crown surface of the piston Tp is low, for example, when warming-up of the engine has not been completed, and an oil temperature and an water temperature have not risen sufficiently yet after the engine is started at a low temperature. FIGS. 15A, 15B, 15C, and 15D are similar to FIGS. 13A, 13B, 13C, and 13D, respectively. Since the temperature of the crown surface of the piston is lower as compared with the case of FIG. 13, split injections are carried out five times after the injection start timing SOIn is set on a little more retarded angle side (BDC side) than the case of FIG. 13 so that penetration of each split injection can be permitted with the processing shown in FIG. 11 when the temperature of the crown surface of the piston is low.

Figure 16:
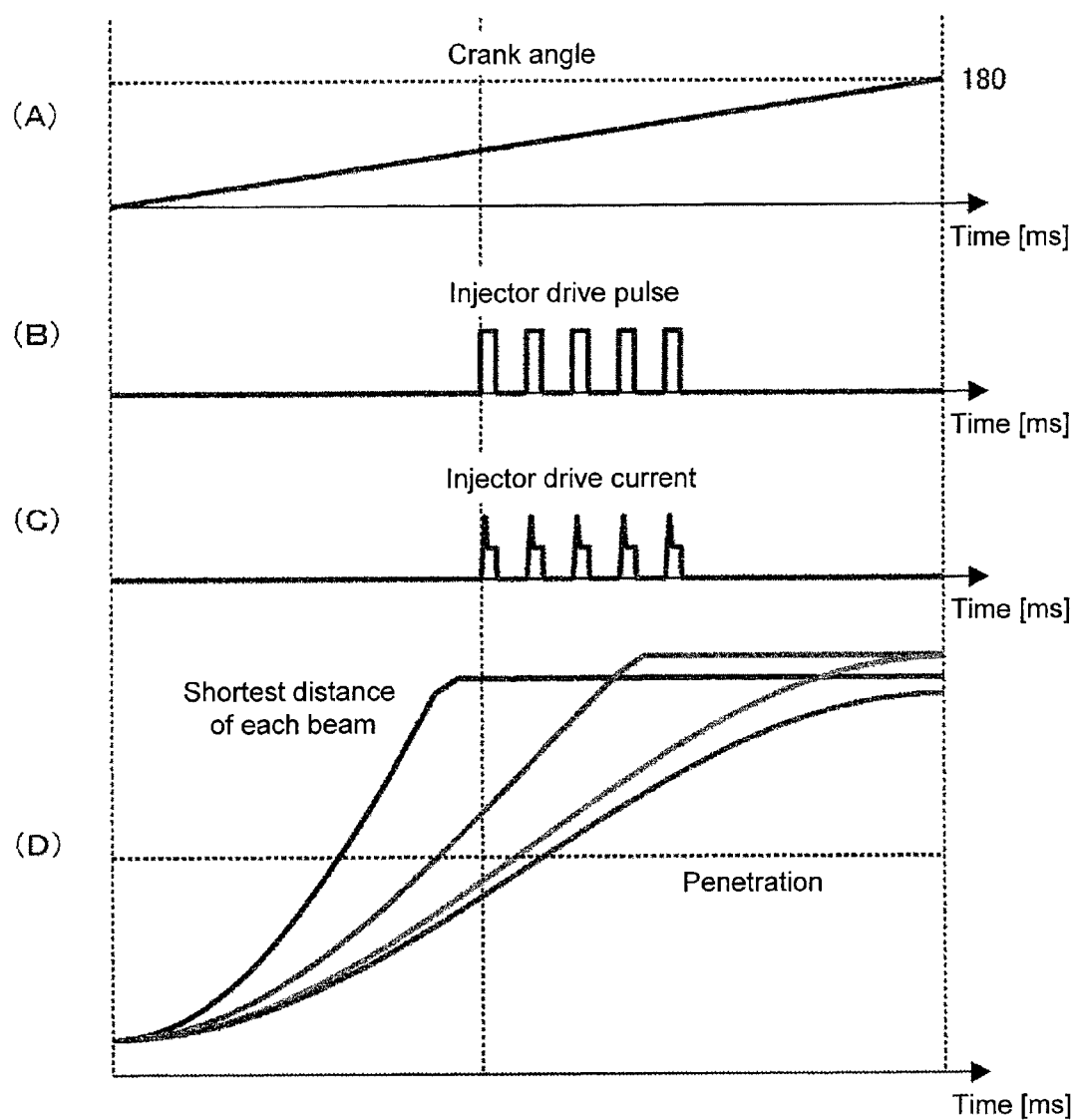
FIG. 16 is a time chart showing a fourth control example of split multi-stage injection control for a direct injection type engine according to one embodiment of the present invention.

FIG. 16 is a time chart when split injections are carried out five times in one cycle when the temperature of the crown surface of the piston Tp is high, for example, when engine is continuously operated at high load. FIGS. 16A, 16B, 16C, and 16D are similar to FIGS. 13A, 13B, 13C, and 13D, respectively. Since the temperature of the crown surface of the piston is higher as compared with the case of FIG. 13, split injections are carried out five times after the injection start timing SOIn is set on a little more retarded angle side (BDC side) than the case of FIG. 13 so that penetration of each split injection can be permitted with the processing shown in FIG. 11 when the temperature of the crown surface of the piston is high.

According to the configuration as shown in FIGS. 8 to 12, the injection timing is set depending on the penetration of each split injection to then carry out split multi-stage injection control in view of the temperature of the crown surface of the piston while maintaining the injection interval for preventing the increase of the penetration in various operational states as shown in FIGS. 13 to 16, thus enabling to reduce fuel adhesion in the cylinder and to suppress the increase of Number of particles and unburned fuel.

Note the following: when the direct injection engine 1 carries out intermittent operation control, in which the engine is temporarily automatically stopped during establishment of a predetermined condition, so-called idle stop, a temperature of a wall surface of the combustion chamber decreases since combustion is not generated during idle stop, but since the temperature permitting injection angle PCAt is calculated at Step 1101 at the setting of the injection timing shown in FIG. 11, the injection timing is set depending on the penetration of each split injection to then carry out split multi-stage injection control in view of the temperature of the crown surface of the piston by applying the present control to an direct injection type engine provided with an idle stop function, whereby fuel adhesion in the cylinder can be reduced, and the increase of Number of particles and unburned fuel can be suppressed in the operation after restarting the direct injection engine 1 from a state of idle stop.

Figure 17:
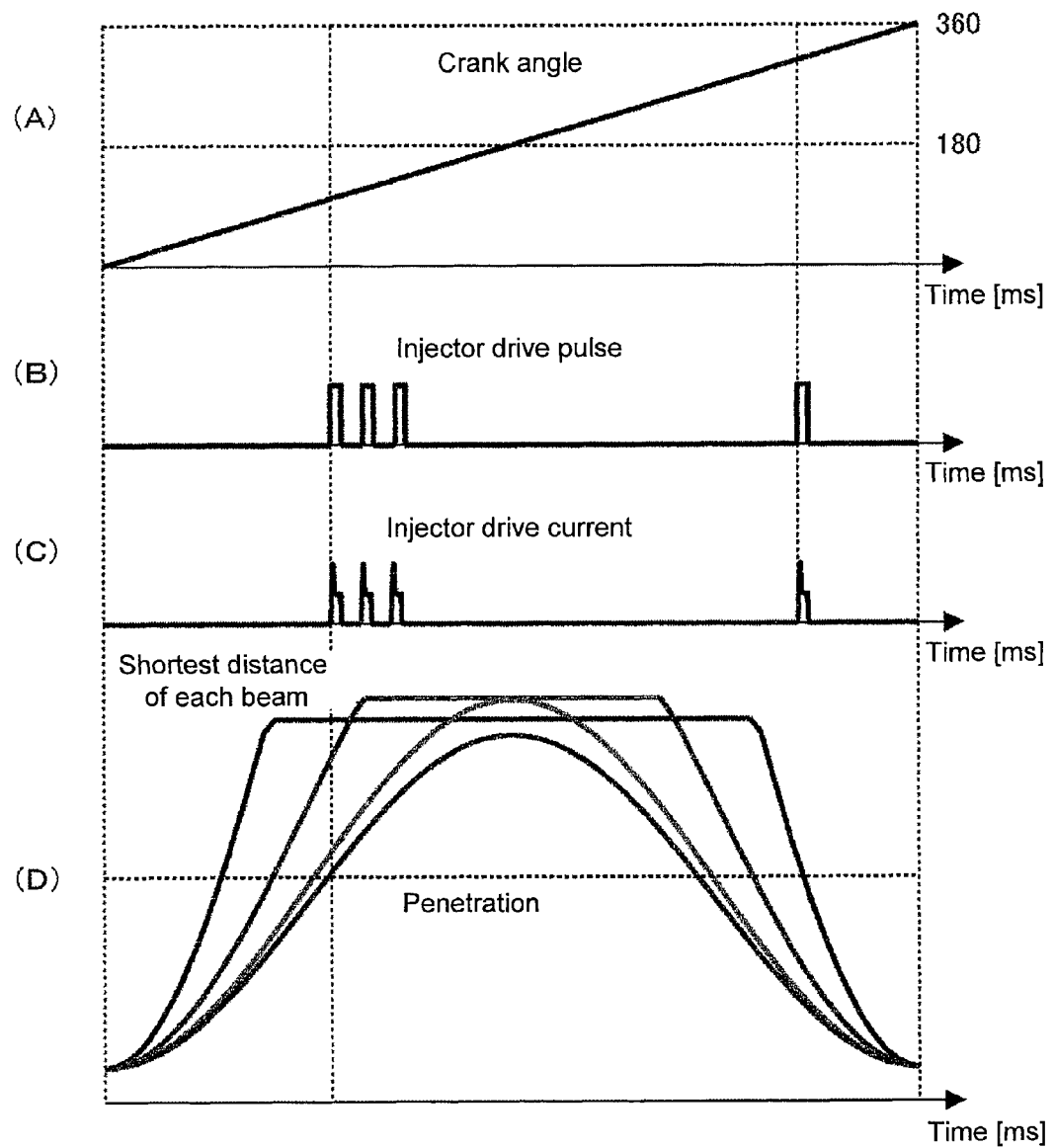
FIG. 17 is a time chart showing a fifth control example of split multi-stage injection control for a direct injection type engine according to one embodiment of the present invention.

FIG. 17 is a time chart when applying split multi-stage injection control shown in FIGS. 8 to 12 to an intake stroke injection in so-called catalyst warming-up control in which weak stratified air-fuel mixture is formed by the intake stroke injection and a compression stroke injection after the engine is started to be cooled, and in which a temperature of catalyst is further risen by retarding the ignition timing. FIGS. 17A, 17B, 17C, and 17D are similar to FIGS. 13A, 13B, 13C, and 13D, respectively. FIG. 17 shows strokes from an intake one to a compression one, and a crank angle in FIG. 17A increases from 0 to 360. Hence, the shortest distance of each beam in FIG. 13D becomes gradually large, and then becomes gradually small. Split injections are carried out three times while the crank angle in FIG. 17A is from 0 to 180, i.e., in the intake stroke. Further, injection is carried out one more times while the crank angle in FIG. 17A is from 180 to 360, i.e., in the compression stroke. According to the configuration described above, the injection timing is set depending on the penetration of each split injection to then carry out split multi-stage injection in the intake stroke injection while forming a combustible air-fuel mixture around the spark plug, thus enabling to reduce fuel adhesion in the cylinder and to suppress the increase of Number of particles and unburned fuel.

Next, using FIGS. 18 to 24, there will be described the details when configuring Step 803 (setting of the split injections) in FIG. 8 by using a system other than the control system shown in FIGS. 9 to 12.

Figure 18:
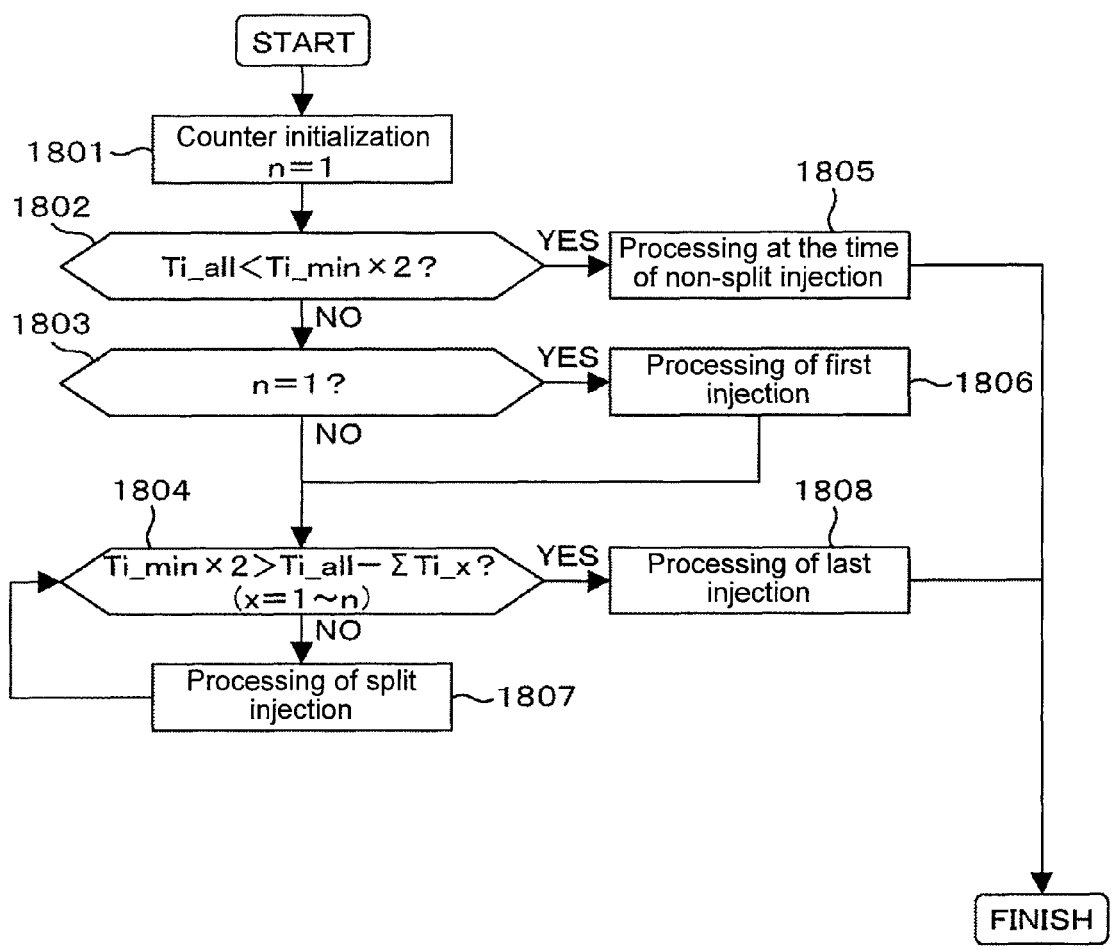
FIG. 18 is a flow chart showing another processing content of setting of split injections shown in FIG. 8.

FIG. 18 is a control flow chart of not a system in which the number of split of the split injections in one cycle is set first, but of a control system in which a pulse width that can permit penetration is calculated to then perform split injections N-times. If the number of split is set as N, each injection pulse width and each injection timing of n=1 to N are set.

At Step 1801, the counter is initialized.

Figure 19:
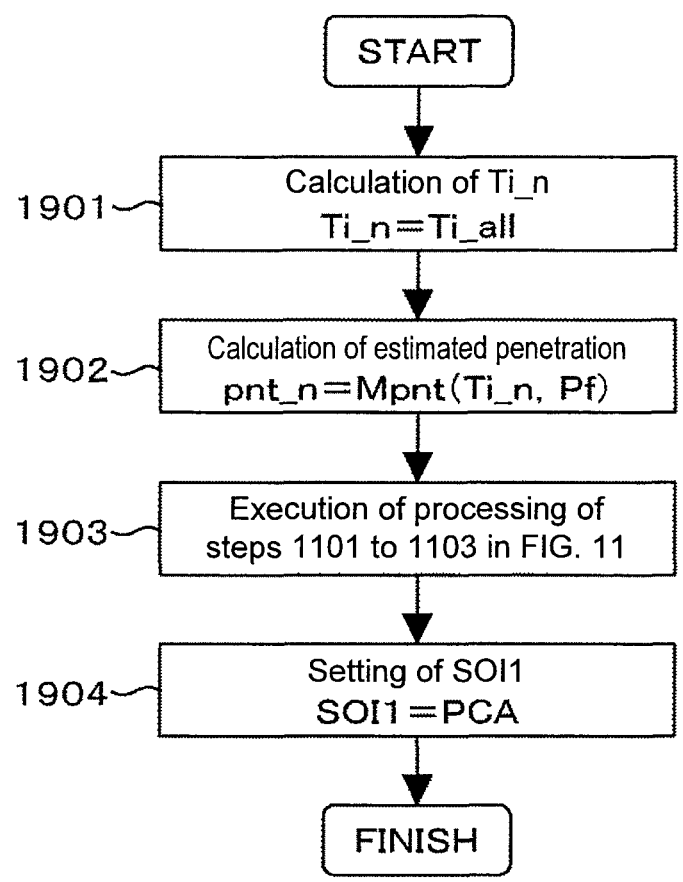
FIG. 19 is a flow chart showing a processing content at the time of non-split injection shown in FIG. 18.

At Step 1802, it is determined whether or not the split injections can be carried out using the total injection pulse width Ti_all and the minimum injection pulse width Ti_min that have been set at Steps 801 and 802 in FIG. 8, respectively. If Ti_all<Ti_min×2, Step 1805 (processing at the time of non-split injection) is executed. The details of Step 1805 are shown in FIG. 19.

Figure 20:
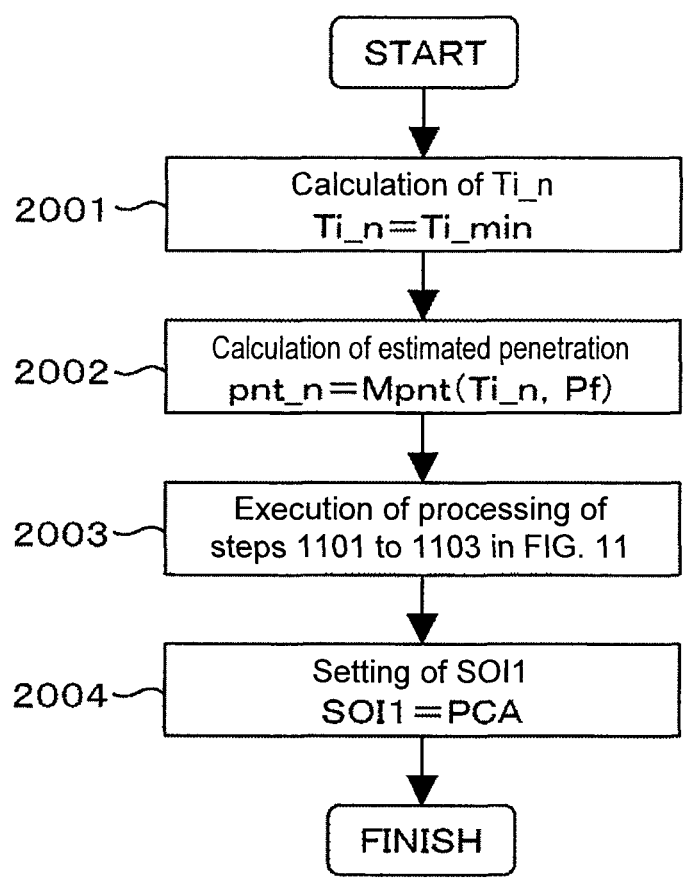
FIG. 20 is a flow chart showing a processing content of the first injection shown in FIG. 18.

At Step 1803, it is determined whether or not setting is the setting of the first injection pulse width and the first injection timing of the split injections in one cycle. If n=1, the program proceeds to Step 1806 (first injection processing), and after executing Step 1806, it proceeds to Step 1807. If n≠1 (in a case of the second or later injection), the program proceeds to Step 1807. The details of Step 1806 are shown in FIG. 20.

Figure 21:
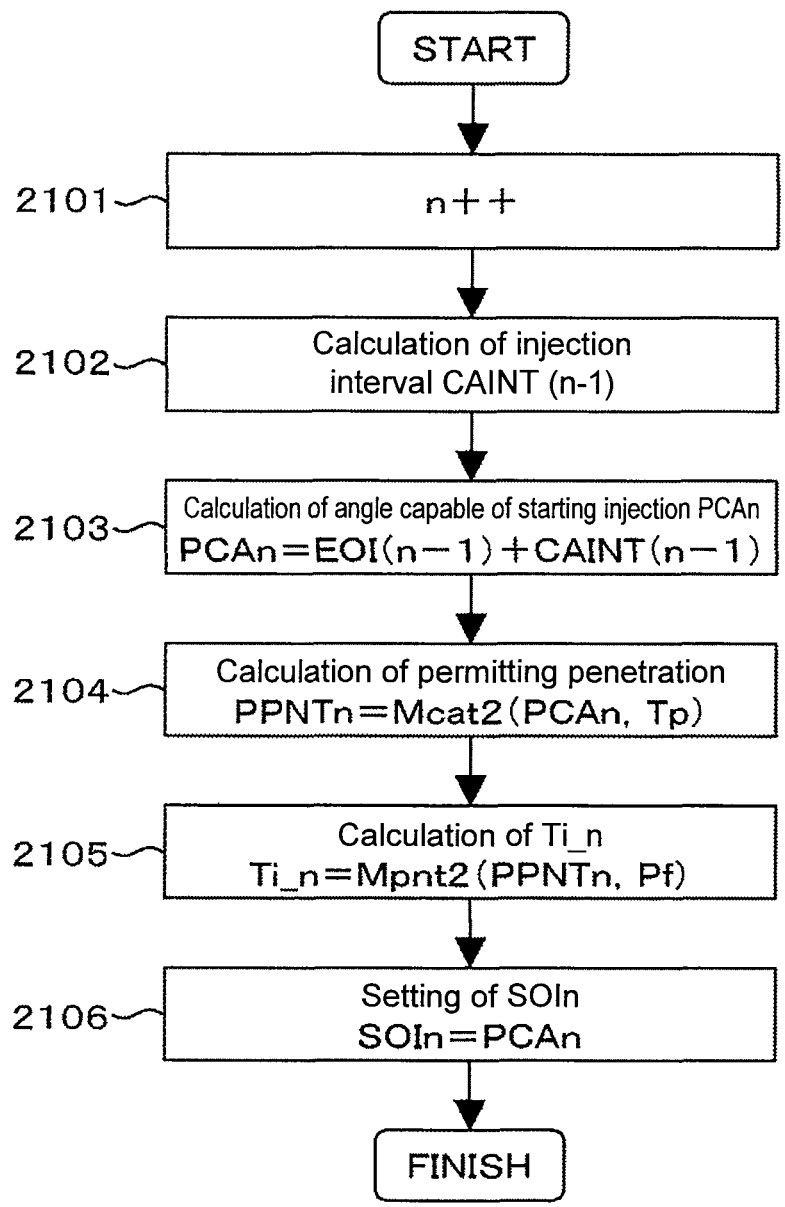
FIG. 21 is a flow chart showing a processing content of split injections shown in FIG. 18.
Figure 22:
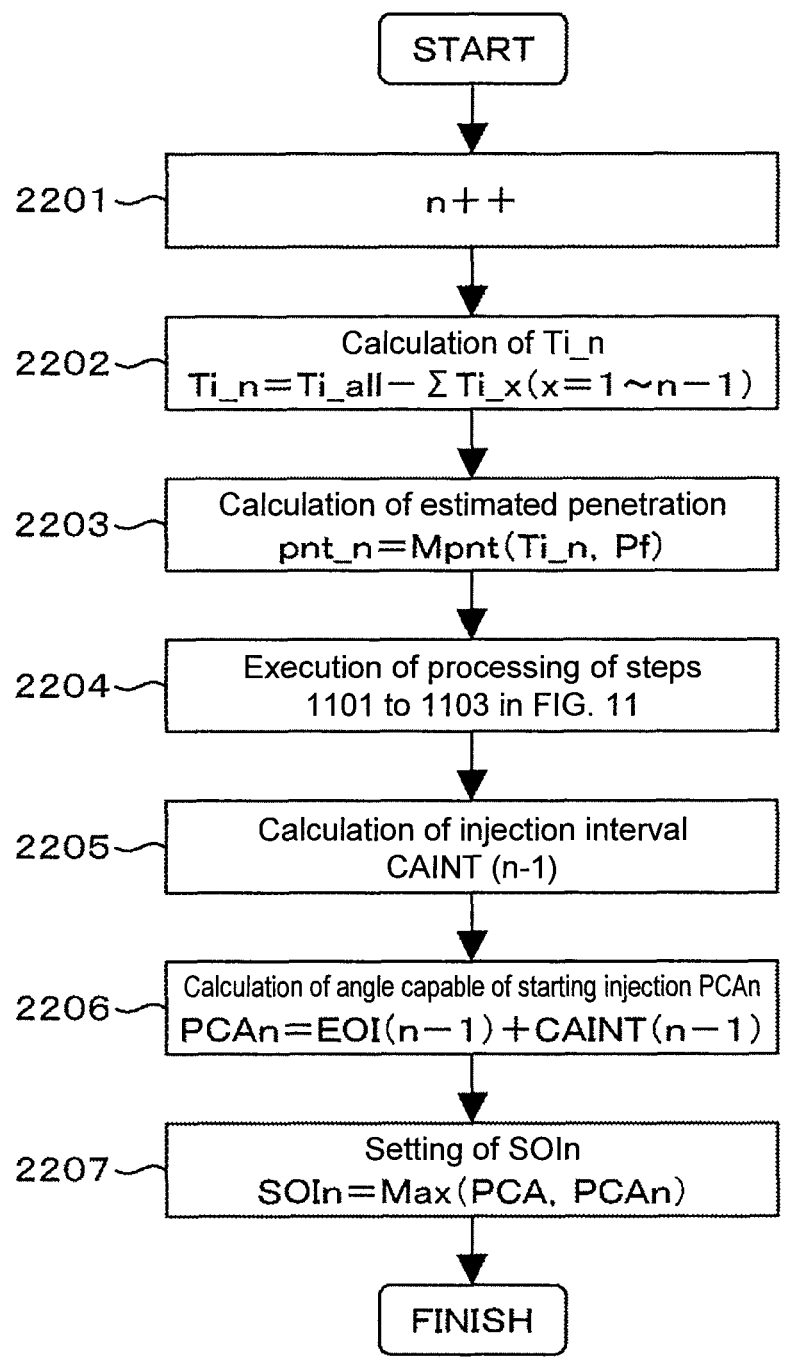
FIG. 22 is a flow chart showing a processing content of the last injection shown in FIG. 18.

At Step 1807, it is determined whether or not a remaining injection time period can further be split that is obtained by subtracting each injection pulse width of the split injections from the total injection pulse width Ti_all. If Ti_min× 2>Ti_all−ΣTi_x (x=1 to n), Step 1808 (last injection processing) is executed. The details of Step 1808 are shown in FIG. 22. If Ti_min×2 Ti_all−ΣTi_x (x=1 to n), Step 1807 (split injection processing) is executed, and then the program returns to Step 1804 again. The details of Step 1807 are shown in FIG. 21.

Next, the details of Step 1805 (processing at the time of non-split injection) in FIG. 18 will be described using FIG. 19.

At Step 1901, the injection pulse width Ti_n is set. Since there is no split, i.e., the number of split N=1 in the processing of FIG. 19, it is set that the n-th injection pulse width Ti_n is equal to the total injection pulse width Ti_all.

At Step 1902, the same processing as Step 905 in FIG. 9 is performed, and the penetration (maximum value of fuel reach distance) pnt_n is calculated.

At Step 1903, processing from Steps 1101 to 1103 in FIG. 11 is performed, and the permitting injection angle PCAt is calculated.

At Step 1904, the program terminates by setting that the first injection start timing SOIL is equal to the permitting injection angle PCA.

Next, the details of Step 1806 (first injection processing) in FIG. 18 will be described using FIG. 20.

At Step 2001, the injection pulse width Ti_n (n=1) is set. It is set that the injection pulse width Ti_n (n=1) is equal to the minimum injection pulse width Ti_min.

At Step 2002, the same processing as Step 905 in FIG. 9 is performed, and the penetration (maximum value of fuel reach distance) pnt_n is calculated.

At Step 2003, processing from Steps 1101 to 1103 in FIG. 11 is performed, and the permitting injection angle PCAt is calculated.

At Step 2004, the program terminates by setting that the injection start timing SOI1 (n=1) is equal to the permitting injection angle PCA.

It is to be noted that although the present embodiment is configured such that the first injection pulse width is set as the minimum injection pulse width Ti_min, it may be configured such that permitting penetration of the first injection is preset based on the temperature of the crown surface of the piston and the temperature of the wall surface of the cylinder bore, or the oil temperature and the water temperature for simplification instead of Steps 1901 to 1902, and that the first injection pulse width is calculated by processing similar to that of Step 2105 in FIG. 21 that will be described hereinafter based on the permitting penetration of the first injection and the fuel pressure.

Next, the details of Step 1807 (split injection processing) in FIG. 18 will be described using FIG. 21.

At Step 2101, increment processing of the counter n is performed.

At Step 2102, an injection interval CAINT (n−1), which is an injection interval between the (n−1)th injection and the n-th injection, is calculated. Processing of Step 2102 is similar to that of Step 906 in FIG. 9.

At Step 2103, the angle capable of starting the n-th injection PCAn is calculated. The angle capable of starting the n-th injection PCAn is calculated by adding the injection interval CAINT(n−1) calculated at Step 2102 to the previous (the (n−1)th) injection end timing EOI (n−1).

At Step 2104, permitting penetration PPNTn, which is the penetration that can be permitted as the n-th injection, is calculated by referring to a map Mcat2, the angle capable of starting the n-th injection PCAn calculated at Step 2103 and the temperature of the crown surface of the piston Tp being as inputs. The map Mcat2 is set as a reverse map of the map Mcat used at Step 1101 of FIG. 11 shown in FIG. 12.

At Step 2105, the injection pulse width Ti_n of the n-th injection is calculated by referring to a map Mpnt2, the permitting penetration PPNTn set at Step 2104 and the fuel pressure Pf being as inputs. The map Mpnt2 is set as a reverse map of the map Mpnt used at Step 905 of FIG. 9 shown in FIG. 10.

At Step 2106, the program terminates by setting the angle capable of starting the n-th injection PCAn calculated at Step 2103 as the n-th injection start timing SOIn.

Next, the details of Step 1808 (last injection processing) in FIG. 18 will be described using FIG. 22.

At Step 2201, increment processing of the counter n is performed.

At Step 2202, the injection pulse width Ti_n corresponding to the last injection (n=N) is set. A value is set as Ti_n that is obtained by subtracting a total value of the first to the (n−1)th injection pulse widths from the total injection pulse width Ti_all.

At Step 2203, the same processing as Step 905 in FIG. 9 is performed, and the penetration (maximum value of fuel reach distance) pnt_n is calculated.

At Step 2204, processing from Steps 1101 to 1103 in FIG. 11 is performed, and the permitting injection angle PCA is calculated.

At Step 2205, the injection interval CAINT (n−1), which is the injection interval between the (n−1)th injection and the n-th injection, is calculated. Processing of Step 2205 is similar to that of Step 906 in FIG. 9.

At Step 2206, the angle capable of starting the n-th injection PCAn is calculated. The angle capable of starting the n-th injection PCAn is calculated by adding the injection interval CAINT(n−1) calculated at Step 2205 to the previous (the (n−1)th) injection end timing EOI (n−1).

At Step 2207, the last injection start timing SOIn (n=N) is calculated. The n-th injection start timing SOIn is set as a larger value of the permitting injection angle PCA calculated at Step 2204 and the angle capable of starting the n-th injection PCAn calculated at Step 2206, i.e., as a value of the advance angle side.

As described above, the processing shown in FIGS. 18 to 22 is executed, whereby each injection timing can be set on the most advanced angle side possible while suppressing the increase of the number of split N, and ensuring the injection intervals of split injections, and additionally, each pulse width that can permit penetration at the injection timing can be calculated to perform split injections.

Next, using FIGS. 23 to 24, there will be described the details when configuring Step 803 (setting of the split injections) in FIG. 8 by using the control system shown in FIGS. 18 to 22.

Figure 23:
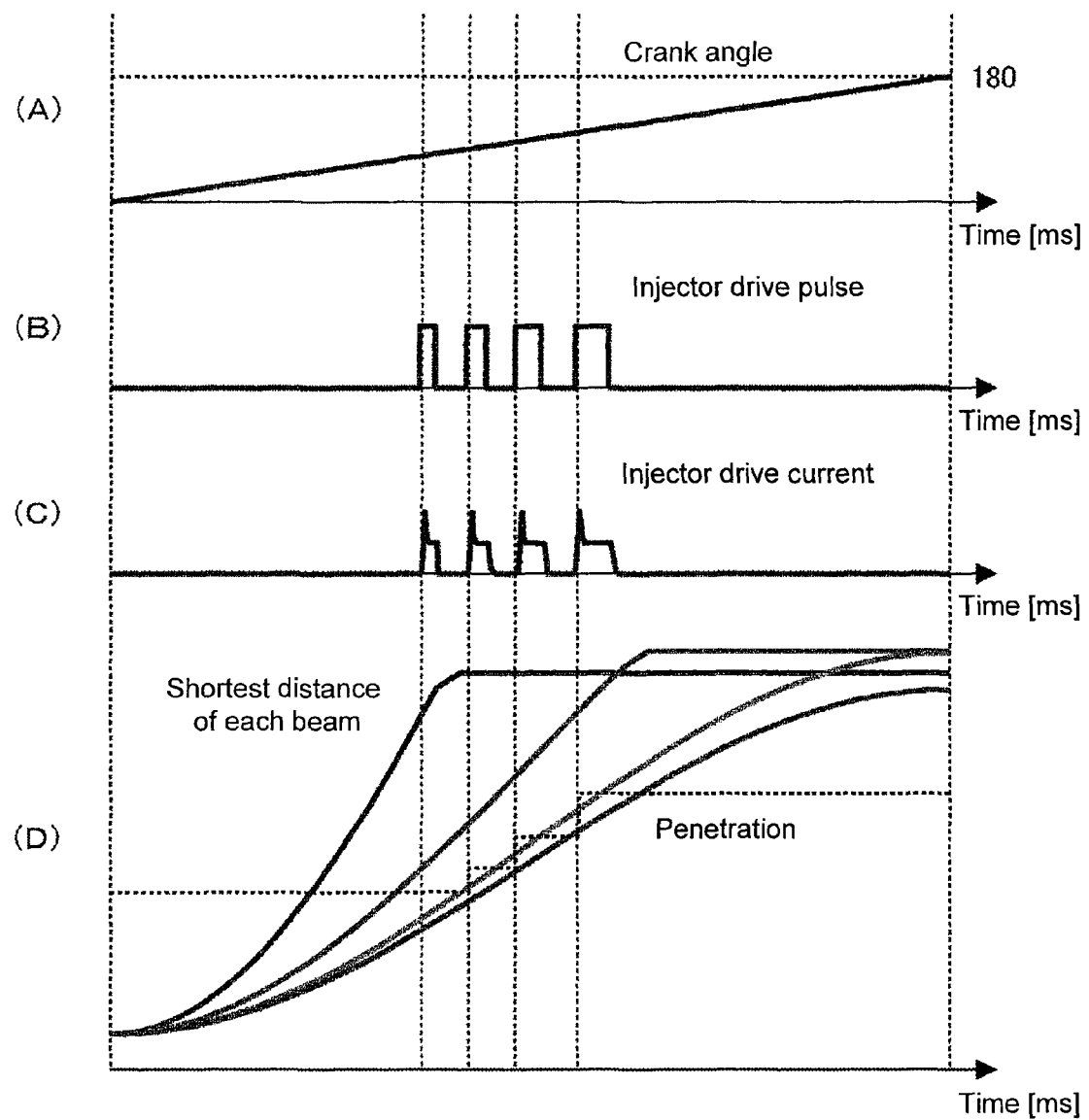
FIG. 23 is a time chart showing a sixth control example of split multi-stage injection control for a direct injection type engine according to one embodiment of the present invention.

FIG. 23 is a time chart when split injections are carried out four times in one cycle when the temperature of the crown surface of the piston Tp is the appropriate one, for example, when warming-up of the engine has been completed to be in normal operation. FIGS. 23A, 23B, 23C, and 23D are similar to FIGS. 13A, 13B, 13C, and 13D, respectively.

A drive pulse of the injector 254 is generated four times in the process of the crank angle in FIG. 23A increasing from 0 to 180, and split injections are carried out four times at the crank angle of 0 to 180, i.e., in the middle of the intake stroke. In the first injection, as well as the injection pulse width being set by Step 1806 in FIG. 18, fuel injection is carried out at the injection timing that can permit the penetration of the injection pulse width. At Step 1807 in FIG. 18, as well as the second injection timing being set after the injection interval CAINT (n−1) after the end of the first injection, the second injection pulse width is set based on the penetration that can be permitted at the timing. Subsequently, as well as the third injection timing being set after the injection interval CAINT (n−1) after the end of the second injection, the third injection pulse width is set based on the penetration that can be permitted at the timing. Lastly, at Step 1808 in FIG. 18, as well as the last, i.e., fourth injection pulse width being set, fuel injection is carried out at the injection timing that can permit the penetration of the injection pulse width.

Figure 24:
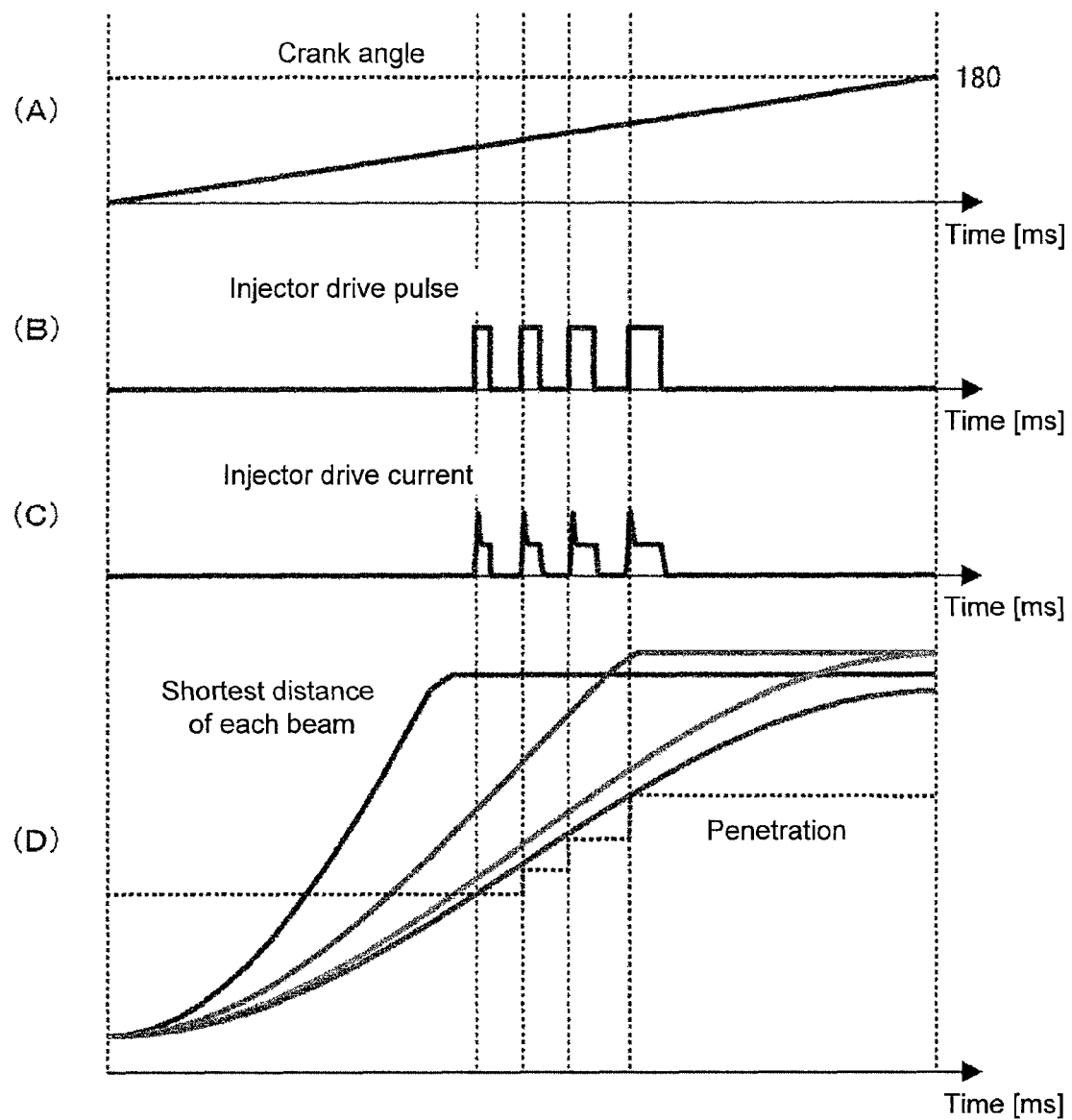
FIG. 24 is a time chart showing a seventh control example of split multi-stage injection control for a direct injection type engine according to one embodiment of the present invention.

FIG. 24 is a time chart when split injections are carried out four times in one cycle when the temperature of the crown surface of the piston Tp is low, for example, when warming-up of the engine has not been completed, and the oil temperature and the water temperature have not risen sufficiently yet after the engine is started at a low temperature. FIGS. 24A, 24B, 24C, and 24D are similar to FIGS. 13A, 13B, 13C, and 13D, respectively. Since the temperature of the crown surface of the piston is lower as compared with the case of FIG. 23, split injections are carried out four times after the injection start timing SOIn is set on a little more retarded angle side (BDC side) than the case of FIG. 23 by the processing shown in FIG. 18.

According to the configuration described above, the injection timing is set depending on the penetration of each split injection to then carry out split multi-stage injection control in view of the temperature of the crown surface of the piston while maintaining the injection interval for preventing the increase of the penetration in various operational states, so that increase of the number of split injections N can be suppressed, and fuel adhesion in the cylinder can also be reduced, thus enabling to suppress the increase of Number of particles and unburned fuel.

What is claimed is:

1. A control apparatus for a direct injection type internal combustion engine having a fuel injection valve that injects fuel into a combustion chamber by controlling a drive current based on an injection pulse width and a fuel rail that stores fuel supplied to the fuel injection valve, wherein:
   the fuel is injected according to a split multi-stage injection control that carries out plural fuel injections in which at least the first injection is performed during an intake stroke,
   intervals, between fuel injections split plural times, are set to have a time duration that is based on at least a fuel pressure in the fuel rail that is necessary to suppress the increase of penetration, and
   when an injection pulse width of the first injection is short, an injection timing of the first injection is set based on the injection pulse width of the first injection so that the injection timing of the first injection is more advanced as compared with a case of a longer injection pulse width of the first injection.

2. The control apparatus according to claim 1, wherein the interval time is set based on the fuel pressure in the fuel rail and at least one of a recovery time for boost during which a voltage supplied to the fuel injection valve is boosted from a battery voltage by a booster circuit, an engine RPM of the internal combustion engine, and an opening and closing timing of an intake valve or an exhaust valve of the internal combustion engine.

3. The control apparatus according to claim 2, wherein
   the internal combustion engine comprises a pressure sensor that detects a fuel pressure in the fuel rail, and
   the control apparatus carries out fuel injections by splitting fuel to be injected in one cycle into fuel for plural injections so that an injection pulse width per one injection of injections split plural times is not less than a minimum pulse width permitted by the fuel injection valve, and also
   a minimum value of the injection pulse width of the fuel injection valve is set based on the fuel pressure detected by the pressure sensor.

4. The control apparatus according to claim 3, wherein a timing when fuel is injected at the minimum value of the injection pulse width is set as a timing when penetration when fuel is injected at the minimum value of the injection pulse width becomes shorter than any shorter one of a distance from an injection port of a fuel injection valve to a crown surface of a piston or a distance to a wall surface of a cylinder bore.

5. The control apparatus according to claim 2, wherein a parameter that influences a temperature of a crown surface of a piston provided in the direct injection type internal combustion engine is detected, and an injection timing of at least the first injection among each of injections split plural times based on the parameter is set.

6. The control apparatus according to claim 5, wherein the parameter is a temperature of a coolant of the direct injection type internal combustion engine, or a temperature of a lubricant thereof.

7. The control apparatus according to claim 5, wherein when the parameter indicates a temperature which is lower than a normal temperature, an injection timing of at least the first injection among each of injections split plural times is retarded as compared with a case of the normal temperature.

8. The control apparatus according to claim 5, wherein when the parameter indicates a temperature which is higher than a normal temperature, an injection timing of at least the first injection among each of injections split plural times is retarded as compared with a case of the normal temperature.

9. The control apparatus according to claim 2, wherein penetration of the first injection is estimated using a pulse width of at least the first injection among each of injections split plural times and the fuel pressure in the fuel rail, and the first injection timing is set based on the estimated penetration.

10. The control apparatus according to claim 9, wherein when the estimated penetration is shorter, an injection timing of the first injection is advanced as compared with a case where the estimated penetration is longer.

11. The control apparatus according to claim 2, wherein penetration of each injection is estimated using an injection pulse width of each of injections split plural times and the fuel pressure in the fuel rail, and each injection timing is set based on the estimated each penetration.

12. The control apparatus according to claim 11, wherein after a previous injection among each of injections split plural times is finished, penetration that is permitted at the injection timing with the predetermined interval time is set, and using the set penetration and the fuel pressure, a pulse width of an injection of this time among each of injections split plural times is set.

13. The control apparatus according to claim 2, wherein the injection timing of the first injection is the same as a timing when fuel is injected at the minimum value of the injection pulse width, or is on a retard angle side.

14. A control apparatus for a direct injection type internal combustion engine having a fuel injection valve that injects fuel into a combustion chamber by controlling a drive current based on an injection pulse width, wherein
when the internal combustion engine is started to be cooled,
split multi-stage injection control is performed that carries out plural fuel injections in which at least the first injection is performed during an intake stroke,
intervals, between fuel injections split plural times, are set to have a time duration that is based on at least a fuel pressure in the fuel rail that is necessary to suppress the increase of penetration, and
when an injection pulse width of the first injection is short, an injection timing of the first injection is set based on the injection pulse width of the first injection so that the injection timing of the first injection is more advanced as compared with a case of a longer injection pulse width of the first injection.

* * * * *